US012628157B2

(12) United States Patent
Xiao et al.

(10) Patent No.: US 12,628,157 B2
(45) Date of Patent: May 12, 2026

(54) METHOD AND SYSTEM FOR RESOLVING TRANSMISSION CONFLICTS IN WIRELESS NETWORK

(71) Applicant: ZTE Corporation, Guangdong (CN)

(72) Inventors: Kai Xiao, Shenzhen (CN); Wei Chen, Shenzhen (CN); Xing Liu, Shenzhen (CN); Xianghui Han, Shenzhen (CN); Wei Gou, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 540 days.

(21) Appl. No.: 17/962,343

(22) Filed: Oct. 7, 2022

(65) Prior Publication Data

US 2023/0036943 A1 Feb. 2, 2023

Related U.S. Application Data

(63) Continuation of application No. PCT/CN2020/083928, filed on Apr. 9, 2020.

(51) Int. Cl.
| | |
|---|---|
| *H04W 72/1268* | (2023.01) |
| *H04W 72/23* | (2023.01) |
| *H04W 72/232* | (2023.01) |
| *H04W 72/566* | (2023.01) |
| *H04W 76/19* | (2018.01) |

(52) U.S. Cl.
CPC ....... *H04W 72/1268* (2013.01); *H04W 72/23* (2023.01); *H04W 72/232* (2023.01); *H04W 72/569* (2023.01); *H04W 76/19* (2018.02)

(58) Field of Classification Search
CPC ............. H04W 72/1268; H04W 72/23; H04W 72/569; H04W 76/19; H04W 72/232
See application file for complete search history.

(56) References Cited

U.S. PATENT DOCUMENTS

| | | | |
|---|---|---|---|
| 2019/0149269 A1 | 5/2019 | Chatterjee et al. | |
| 2021/0068195 A1* | 3/2021 | Yang ..................... | H04L 1/1854 |

(Continued)

FOREIGN PATENT DOCUMENTS

| | | |
|---|---|---|
| CN | 110351834 A | 10/2019 |
| CN | 110582972 A | 12/2019 |

(Continued)

OTHER PUBLICATIONS

Asia Pacific Telecom, Considerations on UL inter-UE prioritization and multiplexing, 3GPP TSG-RAN WG1 Meeting #99, Reno, USA, Nov. 18-22, 2019, R1-1912254 (Year: 2019).*

(Continued)

*Primary Examiner* — Tonia L Dollinger
(74) *Attorney, Agent, or Firm* — Perkins Coie LLP

(57) ABSTRACT

Apparatuses, methods, systems, and computer readable media are disclosed. In one aspect, a wireless communication method is disclosed. The method includes receiving, by a first wireless device, one or more control information messages, at least one of the control information messages including a transmission cancellation indication indicating that a transmission previously scheduled for the first wireless device is to be cancelled, and performing, by the first wireless device, a timing analysis on the at least one of the control information messages including the transmission cancellation indication.

17 Claims, 16 Drawing Sheets

First uplink transmission

Second uplink transmission

Time-frequency resources that are indicated by UL CI

Time-frequency resources that are not indicated by UL CI

(56) References Cited

U.S. PATENT DOCUMENTS

| | | | |
|---|---|---|---|
| 2021/0219278 A1 | 7/2021 | Hu et al. | |
| 2022/0330322 A1 | 10/2022 | Li et al. | |

FOREIGN PATENT DOCUMENTS

| | | | | |
|---|---|---|---|---|
| CN | 110859009 A | * | 3/2020 | ........ H04W 52/0235 |
| CN | 110972303 A | | 4/2020 | |
| WO | 2018143850 A1 | | 8/2018 | |
| WO | 2020033660 A1 | | 2/2020 | |
| WO | 2020069428 A1 | | 4/2020 | |
| WO | 2021041713 A2 | | 3/2021 | |

OTHER PUBLICATIONS

Vivo, UL inter-UE Tx prioritization for URLLC, 3GPP TSG RAN WG1 #100, e-Meeting, Feb. 24-Mar. 6, 2020, R1-2000329 (Year: 2020).*

Qualcomm Incorporated, "Uplink Inter-UE Tx Multiplexing and Prioritization," 3GPP TSG-RAN WG1 #98b, Chongqing, China, R1-1911122, 9 pages, Oct. 14-20, 2019.

Intel Corporation, "Issue Summary for NR Mobility Enhancements," 3GPP TSG RAN WG1 Meeting #100-E, e-Meeting, R1-2000946, 8 pages, Feb. 24-Mar. 6, 2020.

International Search Report and Written Opinion for International Application No. PCT/CN2020/083928, mailed on Mar. 4, 2021 (7 pages).

Asia Pacific Telecom, "Considerations on UL inter-UE prioritization and multiplexing," 3GPP TSG-RAN WG1 Meeting #99, R1-1912254, Reno, USA, Nov. 18-22, 2019 (6 pages).

Vivo, "UL inter-UE Tx prioritization for URLLC," 3GPP TSG RAN WG1 #100, R1-2000329, e-Meeting, Feb. 24-Mar. 6, 2020 (12 pages).

Extended European Search Report for European Patent Application No. 20896260.5, mailed Apr. 4, 2023 (13 pages).

CNIPA, First Office Action for Chinese Application No. 202080099415. 2, mailed on Dec. 9, 2024, 24 pages with unofficial English translation.

ZTE, "UL inter-UE multiplexing between eMBB and URLLC," 3GPP TSG RAN WG1 #98, Prague, Czech Republic, R1-1908239, Aug. 26-30, 2019, 11 pages.

IMPI, First Office Action for Mexican Application No. MX/a/2022/ 012662, mailed on Jul. 16, 2025, 10 pages with unofficial English translation.

CNIPA, Notice of Grant for Chinese Application No. 202080099415. 2, mailed on Jul. 25, 2025, 4 pages with unofficial English translation.

CNIPA, Second Office Action for Chinese Application No. 202080099415.2, mailed on Apr. 30, 2025, 6 pages with English translation.

* cited by examiner

Time-frequency resources that are indicated by UL CI

Time-frequency resources that are not indicated by UL CI

Time-frequency resources that are indicated by UL CI

Time-frequency resources that are not indicated by UL CI

Time-frequency resources that are indicated by UL CI

Time-frequency resources that are not indicated by UL CI

Time-frequency resources that are indicated by UL CI

Time-frequency resources that are not indicated by UL CI

Time-frequency resources that are indicated by UL CI

Time-frequency resources that are not indicated by UL CI

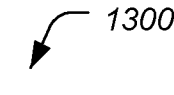

_1300_

1310

Receive, by a first wireless device, one or more control information messages, at least one of the control information messages including a transmission cancellation indication indicating that a transmission previously scheduled for the first wireless device is to be cancelled

1320

Perform, by the first wireless device, a timing analysis on the at least one of the control information messages including the transmission cancellation indication

FIG. 13

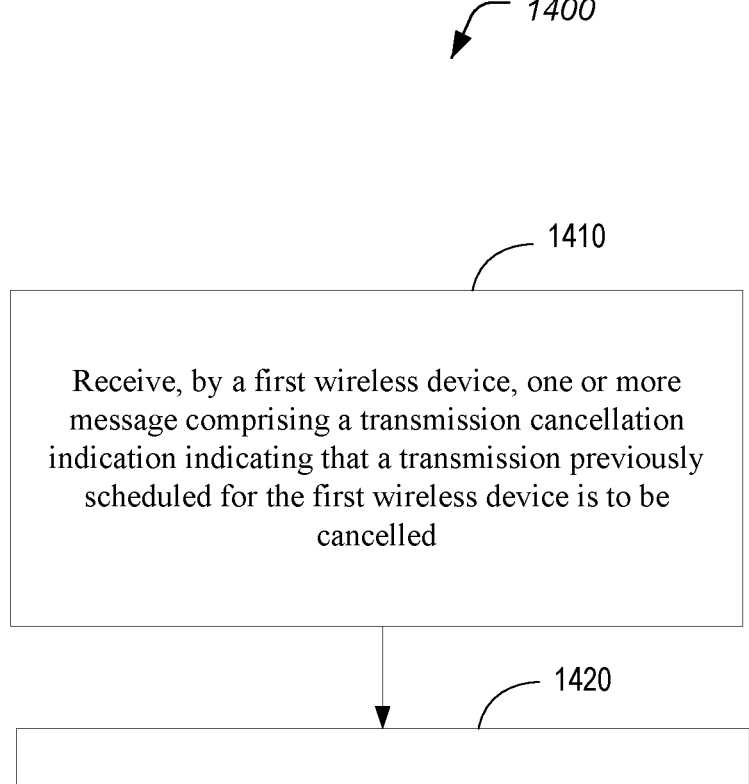

_1400_

_1410_

Receive, by a first wireless device, one or more message comprising a transmission cancellation indication indicating that a transmission previously scheduled for the first wireless device is to be cancelled

_1420_

Implement, by the first wireless device, the transmission cancellation using one of multiple cancellation modes according to a condition associated with the first wireless device

FIG. 14

METHOD AND SYSTEM FOR RESOLVING TRANSMISSION CONFLICTS IN WIRELESS NETWORK

CROSS REFERENCE TO RELATED APPLICATIONS

This patent document is a continuation of and claims benefit of priority to International Patent Application No. PCT/CN2020/083928, filed on Apr. 9, 2020. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Apparatuses, methods, systems, and computer readable media are disclosed. In one aspect, a wireless communication method is disclosed. The method includes receiving, by a first wireless device, one or more control information messages, at least one of the control information messages including a transmission cancellation indication indicating that a transmission previously scheduled for the first wireless device is to be cancelled, and performing, by the first wireless device, a timing analysis on the at least one of the control information messages including the transmission cancellation indication.

In another aspect, the timing analysis includes determining, by the first wireless device, timeline information based on the one or more control information messages and uplink transmissions scheduled by the control information or corresponding to a configured grant, and determining, by the first wireless device, whether the timeline information satisfies a predetermined condition.

In another aspect, the timing analysis includes determining, by the first wireless device, a reference time point based on a first symbol of each of uplink transmissions scheduled by the one or more control information messages, and comparing, by the first wireless device, the reference time point with an arrival timing of the at least one control information message including a transmission cancellation indication indicating that a transmission previously scheduled for the first wireless device is to be cancelled.

In another aspect, a wireless communication method includes receiving, by a first wireless device, one or more message comprising a transmission cancellation indication indicating that a transmission previously scheduled for the first wireless device is to be cancelled, and implementing, by the first wireless device, the transmission cancellation using one of multiple cancellation modes according to a condition associated with the first wireless device.

The above and other aspects and their implementations are described in greater detail in the drawings, the descriptions, and the claims.

BRIEF DESCRIPTION OF THE DRAWING

FIG. 13 depicts an example of a wireless communication method based on some embodiments of the disclosed technology.

FIG. 14 depicts an example of a wireless communication method based on some embodiments of the disclosed technology.

DETAILED DESCRIPTION

Figure 1:
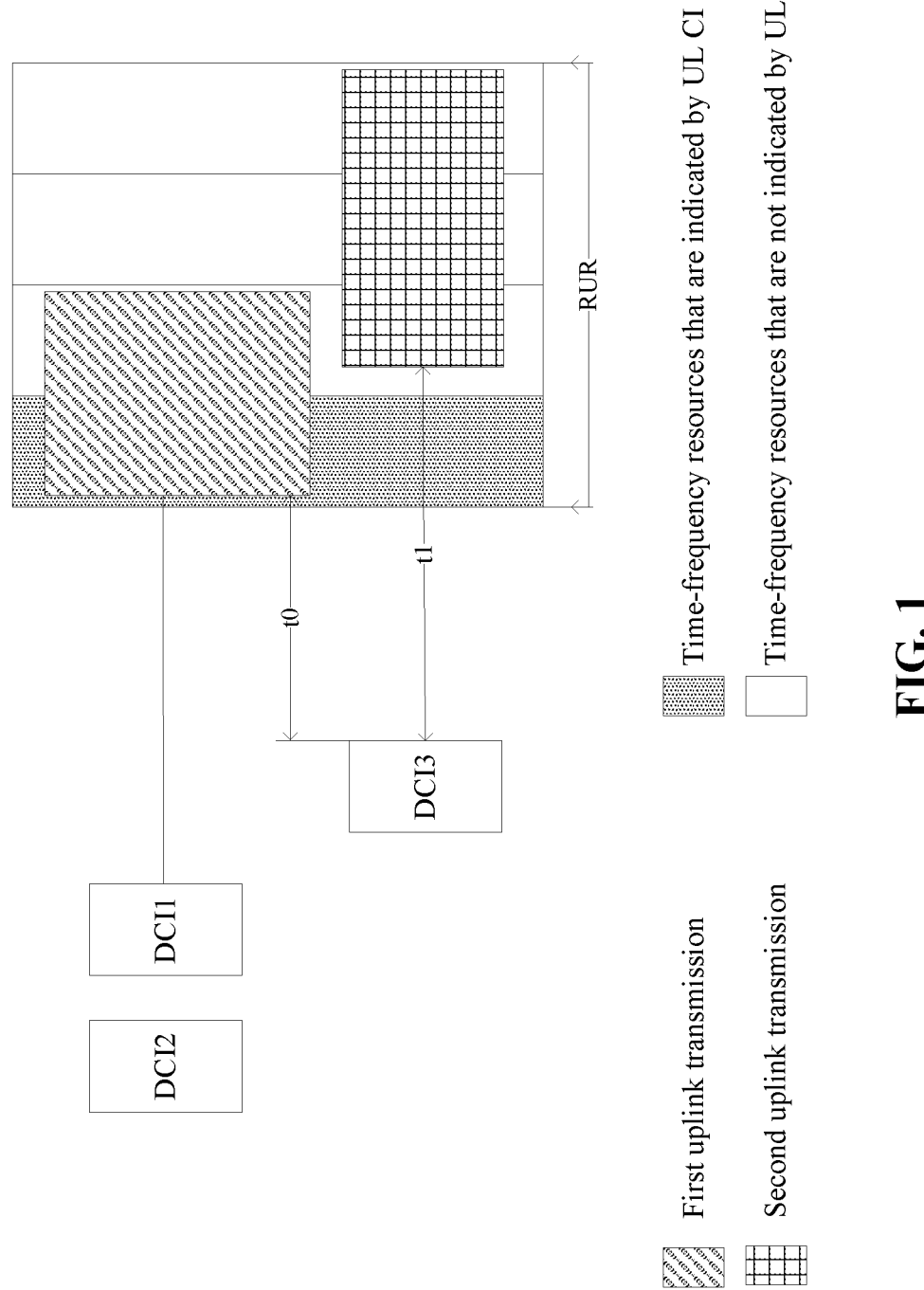
FIG. 1 depicts an example of time-frequency domain resources in which uplink transmissions are scheduled according to control information messages including downlink control information (DCI), based on some example embodiments of the disclosed technology.

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The 5th generation (5G) mobile communication system enables a variety of application scenarios, including Enhanced Mobile Broadband (eMBB), Ultra-Reliable Low Latency Communication (URLLC), and Massive Machine Type of Communication (mMTC). With the increasing use of wireless communication technologies in many applications, the 5G mobile communication focuses on researching and supporting the characteristics of enhanced mobile broadband, ultra-high reliability, ultra-low-latency transmission, and massive connections.

In uplink service transmission scenarios, in order to support the terminal's higher-priority transmission service, a network node may schedule the transmission service through downlink control information (DCI). However, resource scheduling conflicts may occur when a time-frequency resource have been scheduled for a transmission of certain uplink services before the same time-frequency resource is scheduled to a certain terminal. In order to avoid conflicts between two different terminals, lower-priority services are canceled or carried over. Information is reused in the time-frequency resources of higher priority services. At the same time, in order to ensure high-reliability, low-latency transmission characteristics of high-priority uplink transmission services from other terminals, the network nodes will prioritize resources for the transmission services, and the target resources are now assigned the higher-priority services. The transmission service is occupied by the terminal, and the terminal will further cancel the transmission of the higher-priority service according to uplink cancellation information (Uplink Cancelation Information, ULCI) carried by the DCI to ensure the uplink transmission service of other terminals. If the lower-priority service previously cancelled by the terminal does not conflict with the high-priority service of other terminals, the cancellation of this service is a redundant and unnecessary operation, causing a decrease in the overall performance of the terminal.

The performance decrease caused by the terminal's additional cancellation of uplink transmission services can be offset by recovering the lower priority services previously cancelled by the terminal. Since it takes a certain time to resume the cancelled service, the terminal cannot recover the cancelled uplink transmission service in all cases.

The disclosed technology can be implemented in some embodiments to ensure that the terminal can resume the cancelled uplink transmission service. The disclosed technology can also be implemented in some embodiments to provide methods and systems for handling conflicts in transmission services to avoid the extra cancellations caused by conflicts between terminals and intra-terminal services.

The methods and systems implemented based on some embodiments of the disclosed technology can improve the efficiency of resource use and avoid the occurrence of unnecessary additional cancellation by flexibly cancelling scheduled uplink transmissions and efficiently adjusting the sequence of the execution of transmission cancellation.

EXAMPLE EMBODIMENTS

Example 1

The disclosed technology can be implemented in some embodiments to prove methods and systems for a user equipment (User Equipment, UE) to cancel uplink transmission as discussed below.

FIG. 1 depicts an example of time-frequency domain resources in which uplink transmissions are scheduled according to control information messages including downlink control information (DCI), based on some example embodiments of the disclosed technology.

In some embodiments of the disclosed technology, a base station sends downlink control information (DCI) to a UE, and the UE that has received the DCI schedules uplink transmission or cancels uplink transmission according to the information carried by the DCI. As shown in FIG. 1, the base station sends DCI1, DCI2, and DCI3. DCI1 schedules a first uplink transmission, DCI2 schedules a second uplink transmission, and DCI3 message carries transmission cancellation information such as ULCI (Uplink Cancelation Information). The ULCI indicates that a third uplink transmission of other terminals is on an uplink reference resource (e.g., in Reference Uplink Resource (RUR) as illustrated in FIG. 1). When the UE transmits the first uplink transmission and the second uplink transmission, there are two cases of the priority of the two types of transmission services. Specifically, the priority of the first uplink transmission is higher than the priority of the second uplink transmission, or the first uplink transmission and the second uplink transmission have the same priority. The first uplink transmission completely or partially overlaps the second uplink transmission in the time domain, and the first uplink transmission completely or partially overlaps the time-frequency resources that need to be occupied in the RUR.

According to the service conflict cancellation rule in an intra-UE prioritization/multiplexing mechanism which has been agreed, when the first uplink transmission priority is higher than the second uplink transmission priority, the UE will cancel the second uplink transmission entirely. When the first uplink transmission priority is the same as the second uplink transmission priority, and when the first uplink transmission is a physical uplink shared channel (PUSCH) and the second uplink transmission is a physical uplink control channel (PUCCH), the UE will cancel the second uplink transmission entirely, and the information carried by the second uplink transmissions is multiplexed on the first uplink transmission. According to the service conflict cancellation rule in the inter-UE prioritization/multiplexing mechanism which has been agreed, UE needs to cancel the first uplink transmission. The UE receives DCI1, DCI2, and DCI3 within a short time frame, e.g., one slot, and a method for canceling uplink transmission includes at least one of the following:

Method 1:

In some embodiments of the disclosed technology, a UE may perform a timing analysis on control information messages including DCI and/or ULCI to implement a transmission cancellation using one of multiple cancellation modes based on the timing analysis. In some implementations, the timing analysis is conducted based on a timeline associated with the control information messages including DCI and/or ULCI. In one example, a new timeline is defined in the protocol. In another example, a timeline that is defined in the current protocol can be used for the purpose of timing analysis based on the embodiments of the disclosed technology. In some implementations, a first timeline and a second timeline are set for such timing analysis purposes. The first timeline is assumed to be n symbols, and the second timeline is assumed to be m symbols. The UE determines the cancellation sequence of the uplink transmission by checking whether the time t0 and t1 of the target DCI to the target uplink transmission satisfies a predetermined timeline condition. Based on the target DCI and the target uplink transmission, it can be determined the start time point and end time point of t0 and t1. In some implementations, if t0 is not less than n, it can be said that t0 satisfies the predetermined timeline condition, and if t1 is not less than m, it can be said that t1 satisfies the predetermined timeline condition.

When both t0 and t1 satisfy the predetermined timeline condition, the UE first performs an inter-UE cancellation, that is, the UE first cancels the uplink transmission that completely or partially overlaps the time-frequency resource occupied by an uplink transmission of another UE and indicated by ULCI. When at least one of t0 and t1 do not satisfy the predetermined timeline condition, the UE performs cancellation in sequence of the arrival of the DCI messages (e.g., on a first-arrival-first-execution basis) or performs an intra-UE cancellation under existing agreements.

Further, the method that UE determines n and m includes at least one of the following:

(1) The values of n and m (e.g., $T_{pro,2}$, the time that the UE decodes DCI and prepares to send or cancels an uplink transmission) are pre-defined in the protocol;

(2) A set of candidate values of n and m is pre-defined in the protocol, and the UE determines a specific value according to its own capability;

(3) A fixed value k (e.g., $T_{pro,2}$, the time that the UE decodes DCI and prepares to send) is pre-defined in the protocol, and a set of candidate values of d1 and d2, which are the time that the UE cancels a UL transmission or prepares a channel (e.g., the time it takes for the UE to cancel a UL transmission or prepare a channel for a transmission), is pre-defined in the protocol, and the UE determines a value from the candidate values according to its own capability, and the specific values of n and m are determined after adding k value; and (4) The candidate values of n and m are predefined in the protocol and configured through RRC signaling to the UE.

In one example, the pre-defined values of n and m in the protocol may be the time it takes for the UE to decode DCI and prepare or cancel an uplink transmission. In one example, the fixed value k may be the time it takes for the UE to decode DCI and prepare a transmission.

Method 2:

In one example, a new timeline is defined in the protocol. In another example, a timeline that is defined in the current protocol can be used for the purpose of timing analysis based on the embodiments of the disclosed technology. In some implementations, a first timeline is set for timing analysis purposes. By way of example and not by limitation, the first timeline is assumed to be n symbols. The UE determines the cancellation sequence of the uplink transmission by checking whether the time t0 from the target DCI to the target uplink transmission satisfies the predetermined timeline condition. The target DCI and the target uplink transmission can determine the start time point and end time point of to, where t0 satisfies the predetermined timeline condition when to is less than n.

Specifically, when t0 satisfies the predetermined timeline condition, the UE first performs an inter-UE cancellation, that is, the UE first cancels the uplink transmission that completely or partially overlaps the time-frequency resources occupied by an uplink transmission of another UE and indicated by ULCI. When t0 does not satisfy the predetermined timeline condition, the UE performs cancellation in sequence of the arrival of the DCI messages (e.g., on a first-arrival-first-execution basis) or performs an intra-UE cancellation under existing agreement.

Further, the method of determining, by the UE, the value of n includes at least one of the following:

(1) The values of n (e.g., $T_{pro,2}$, the time that the UE decodes DCI and prepares to send or cancels an uplink transmission) are pre-defined in the protocol;

(2) A set of candidate values of n is pre-defined in the protocol, and the UE determines a specific value according to its own capability;

(3) A fixed value k (e.g., $T_{pro,2}$, the time that the UE decodes DCI and prepares to send) is pre-defined in the protocol, and a set of candidate values of d1, which is the time that the UE cancels a UL transmission or prepares a channel (e.g., the time it takes for the UE to cancel a UL transmission or prepare a channel for a transmission), is pre-defined in the protocol, and the UE determines a value from the candidate values according to its own capability, and the specific values of n are determined after adding k value; and (4) The candidate value of the protocol predefined n is configured through RRC signaling to the UE.

In one example, the pre-defined values of n in the protocol may be the time it takes for the UE to decode DCI and prepare or cancel an uplink transmission. In one example, the fixed value k may be the time it takes for the UE to decode DCI and prepare a transmission.

Method 3:

In one example, a new timeline is defined in the protocol. In another example, a timeline that is defined in the current protocol can be used for the purpose of timing analysis based on the embodiments of the disclosed technology. In some implementations, a second timeline is set for timing analysis purposes. By way of example and not by limitation, the second timeline is assumed to be m symbols. The UE determines the cancellation sequence of the uplink transmission by checking whether the time t1 from the target DCI to the target uplink transmission satisfies the predetermined timeline condition. The target DCI and the target uplink transmission can determine the start time point and end time point of t1, where t1 satisfies the predetermined timeline condition when t0 is less than m.

Specifically, when t1 satisfies the predetermined timeline condition, the UE first performs an inter-UE cancellation, that is, the UE first cancels an uplink transmission that completely or partially overlaps the time-frequency resources occupied by an uplink transmission of another UE and indicated by ULCI. When t1 does not satisfy the predetermined timeline condition, the UE performs cancellation in sequence of the arrival of the DCI messages (e.g., on a first-arrival-first-execution basis) or performs an intra-UE cancellation under an existing agreement.

Further, the method of determining, by the UE, the value of m includes at least one of the following:

(1) The values of m (e.g., $T_{pro,2}$, the time that the UE decodes DCI and prepares to send or cancels an uplink transmission) are pre-defined in the protocol;

(2) A set of candidate values of m is pre-defined in the protocol, and the UE determines a specific value according to its own capability;

(3) A fixed value k (e.g., $T_{pro,2}$, the time that the UE decodes DCI and prepares to send) is pre-defined in the protocol, and a set of candidate values of d2, which is the time that the UE cancels a UL transmission or prepares a channel (e.g., the time it takes for the UE to cancel a UL transmission or prepare a channel for a transmission), is pre-defined in the protocol, and the UE determines a value from the candidate values according to its own capability, and the specific values of m are determined after adding k value; and (4) The candidate value of the predefined m of the protocol is configured through RRC signaling to the UE.

In one example, the pre-defined value of m in the protocol may be the time it takes for the UE to decode DCI and prepare or cancel an uplink transmission. In one example, the fixed value k may be the time it takes for the UE to decode DCI and prepare a transmission.

The UE needs to determine the actual time domain length of t0 when checking whether t0 satisfies the timeline condition. The UE determines the time domain length of t0 by simple calculation based on the start time point and end time point. The method for the specific UE to determine the start time point of t0 includes at least one of the following:

(1) The start time point of t0 is the last symbol of the DCI message carrying ULCI; and (2) The start time point of t0 is the last symbol of the last target DCI that the UE can respond to. Specifically, the target DCI is the last arrived in a group of DCIs. The group of DCIs includes all DCI messages that schedule the first uplink transmissions and the second uplink transmissions and/or carry the ULCI.

The method of determining, by the UE, the end time point of t0 includes at least one of the following:

(1) The end time point of t0 is a first symbol or a first symbol of the part to be cancelled of the earliest uplink transmission among a group of uplink transmissions that at least partially overlap with one another;

(2) The end time point of t0 is a first symbol or a first symbol of the part to be cancelled of the earliest uplink transmission in a group of uplink transmissions that at least partially overlap with one another and overlap with the RUR completely or partially;

(3) The end time point of t0 is a first symbol or a first symbol of the part to be cancelled of the earliest high-priority uplink transmission among a group of uplink transmissions that at least partially overlap with one another;

(4) The end time point of t0 is a first symbol or a first symbol of the part to be cancelled of the earliest high-priority uplink transmission in a group of uplink transmissions that at least partially overlap with one another and overlap with the RUR completely or partially;

(5) The end time point of t0 is a first symbol or a first symbol of the part to be cancelled of the earliest high-priority PUSCH among a group of uplink transmissions that at least partially overlap with one another;

(6) The end time point of t0 is a first symbol or a first symbol of the part to be cancelled of the earliest high-priority PUSCH in a group of uplink transmissions that at least partially overlap with one another and overlap with the RUR completely or partially; and (7) The end time point of t0 is a first symbol or a first symbol of the part to be cancelled of the earliest uplink transmission in a group of uplink transmissions that at least partially overlap with one another and completely or partially overlap a time-frequency resource indicated by the ULCI.

In an implementation, the group of uplink transmissions may include all uplink transmissions in the uplink transmission from the UE that completely or partially overlap with other uplink transmissions in the time domain. In another implementation, the overlapping uplink transmission group includes all the uplink transmissions that completely or partially overlap with other uplink transmissions and the time-frequency resources occupied by an uplink transmission of another UE and indicated by ULCI that is considered as a high-priority uplink transmission.

As shown in FIG. 1, the start time point of t0 is the last symbol of DCI3 message carrying ULCI, and the end time point of t0 is a first symbol of the earliest uplink transmission.

The UE needs to determine the actual time domain length of t1 when checking whether t1 satisfies the timeline condition. The UE determines the time domain length of t1 by simple calculation based on the start time point and end time point. The method for the specific UE to determine the start time point t1 includes at least one of the following:

(1) The start time point of t1 is the last symbol of the DCI message carrying ULCI; and (2) The start time point of t1 is the last symbol of the last target DCI that the UE can respond to. Specifically, the target DCI is the last arrived in a group of DCIs. The group of DCIs includes all DCI messages that schedule the first uplink transmissions and the second uplink transmissions and/or carry the ULCI.

The method of determining, by the UE, the end point of t1 includes at least one of the following:

(1) In a group of uplink transmissions that at least partially overlap with one another, the uplink transmission that completely or partially overlaps with the resource occupied by an uplink transmission of another UE and indicated by ULCI is recorded as A. The end time point of t1 is a first symbol or a first symbol of the part to be cancelled of the earliest uplink transmission that completely or partially overlaps with the uplink transmission A and does not completely or partially overlap with the resource occupied by an uplink transmission of another UE and indicated by ULCI.

(2) In a group of uplink transmissions that at least partially overlap with one another, among the uplink transmissions that completely or partially overlap with the RUR, the uplink transmission that completely or partially overlaps with the resource occupied by an uplink transmission of another UE and indicated by ULCI is recorded as A. The time end of t1 is a first symbol or a first symbol of the part to be cancelled of the earliest uplink transmission that completely or partially overlaps with uplink transmission A and does not completely or partially overlap with the resource occupied by an uplink transmission of another UE and indicated by ULCI.

(3) The end time point of t1 is a first symbol or a first symbol of the part to be cancelled of the uplink transmission that needs to be saved or restored in a group of uplink transmissions that at least partially overlap with one another.

The group of uplink transmissions may include all uplink transmissions transmitted by the UE that completely or partially overlap with other uplink transmissions in the time domain.

As shown in FIG. 1, the start time point of t1 is the last symbol of DCI3 message carrying ULCI, and the end time point of t1 is the first symbol of the second uplink transmission that arrives first and completely or partially overlaps the first uplink transmission and does not completely or partially overlap with the resource occupied by an uplink transmission of another UE and indicated by ULCI.

Example 2

The disclosed technology can be implemented in some embodiments to prove methods and systems for a user equipment (UE) to cancel uplink transmission as discussed below.

Figure 2:
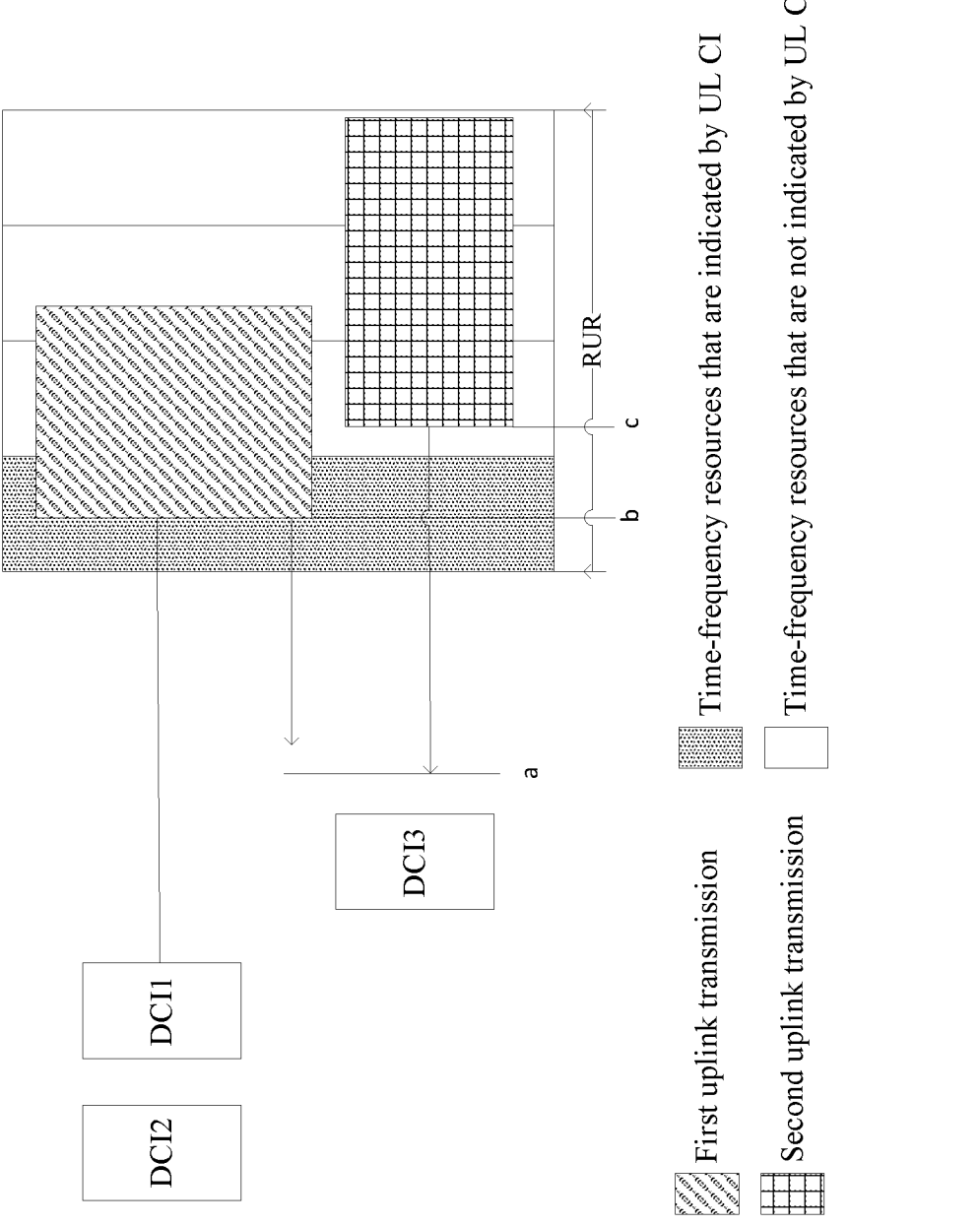
FIG. 2 depicts another example of time-frequency domain resources in which uplink transmissions are scheduled according to control information messages including downlink control information (DCI), based on some example embodiments of the disclosed technology.

FIG. 2 depicts an example of time-frequency domain resources in which uplink transmissions are scheduled according to control information messages including downlink control information (DCI), based on some example embodiments of the disclosed technology.

In some embodiments of the disclosed technology, the base station sends downlink control information (DCI) to the UE, and the UE that receives the DCI schedules uplink transmission or cancels uplink transmission according to the information carried by the DCI. As shown in FIG. 2, the base station sends DCI1, DCI2, and DCI3. DCI1 schedules the first uplink transmission, DCI2 schedules the second uplink transmission, and DCI3 message carries transmission cancellation information such as ULCI. The ULCI indicates that time-frequency resources (e.g., in Reference Uplink Resource (RUR) as illustrated in FIG. 2) need to be occupied by the third uplink transmission of other terminals needs to be occupied. When the UE transmits the first uplink transmission and the second uplink transmission, there are two cases of the priority of the two types of transmission services. Specifically, the first uplink transmission has a higher priority than the second uplink transmission, or the first uplink transmission and the second uplink transmission have the same priority. The first uplink transmission completely or partially overlaps the second uplink transmission in the time domain, and the first uplink transmission completely or partially overlaps the time-frequency resources that need to be occupied in the RUR.

According to the service conflict cancellation rule in an intra-UE prioritization/multiplexing mechanism which has been agreed, when the first uplink transmission priority is higher than the second uplink transmission priority, the UE will cancel the second uplink transmission entirely. When the first uplink transmission priority is the same as the second uplink transmission priority, and when the first uplink transmission is physical uplink shared channel (PUSCH) and the second uplink transmission is physical uplink control channel (PUCCH), the UE will cancel the second uplink transmission entirely, and the information carried by the second uplink transmissions is multiplexed on the first uplink transmission. According to the service conflict cancellation rule in an inter-UE prioritization/multiplexing mechanism which has been agreed, the UE needs to cancel the first uplink transmission. The UE receives DCI1, DCI2, and DCI3 within a short time frame, e.g. one slot, and the method for canceling uplink transmission includes at least one of the following:

Method 1:

In some embodiments of the disclosed technology, a UE may perform a timing analysis on control information messages including DCI and/or ULCI to implement a transmission cancellation using one of multiple cancellation modes based on the timing analysis. In some implementations, the timing analysis is conducted based on a timeline and/or a reference time point inferred from the control information messages including DCI and/or ULCI. In one example, a new timeline is defined in a protocol. In another example, a timeline that is defined in the current protocol can be used for the purpose of timing analysis based on the embodiments of the disclosed technology. In some implementations, a first timeline and a second timeline are set for such timing analysis purposes, assuming the first timeline is n symbols, and the second timeline is m symbols. The UE infers a reference time point for the latest DCI message carrying ULCI by the first time end point, the second time end point and the timeline value. If the DCI message carrying ULCI arrives before the reference time point, the UE first performs inter-UE cancellation, that is, the UE cancel an uplink transmission that completely or partially overlaps the time-frequency resources occupied by an uplink transmission of another UE and indicated by ULCI. If the DCI message carrying ULCI does not arrive before this reference time point, the UE performs cancellation in sequence of the arrival of the DCI messages (e.g., on a first-arrival-first-execution basis) or performs an intra-UE cancellation under an existing agreement. If two different reference time points are derived from a first time end point and a second time end point, the one in front of the other in the time domain is selected as the reference time point.

Further, the method of determining, by the UE, the values of n and m includes at least one of the following:

(1) The values of n and m (e.g., $T_{pro,2}$, the time that the UE decodes DCI and prepares to send or cancels an uplink transmission) are pre-defined in the protocol;

(2) A set of candidate values of n and m is pre-defined in the protocol, and the UE determines a specific value according to its own capability;

(3) A fixed value k (e.g., $T_{pro,2}$, the time that the UE decodes DCI and prepares to send) is pre-defined in the protocol, and a set of candidate values of d1 and d2, which are the time that the UE cancels a UL transmission or prepares a channel (e.g., the time it takes for the UE to cancel a UL transmission or prepare a channel for a transmission), is pre-defined in the protocol, and the UE determines a value from the candidate values according to its own capability, and the specific values of n and m are determined after adding k value; and (4) The candidate values of n and m are predefined in the protocol and configured through RRC signaling to the UE.

In one example, the pre-defined values of n and m in the protocol may be the time it takes for the UE to decode DCI and prepare or cancel an uplink transmission. In one example, the fixed value k may be the time it takes for the UE to decode DCI and prepare a transmission.

Method 2:

In one example, a new timeline is defined in the protocol. In another example, a timeline that is defined in the current protocol can be used for the purpose of timing analysis based on the embodiments of the disclosed technology. In some implementations, a first timeline is set for timing analysis purposes, assuming the first timeline is n symbols. The UE infers the reference time point for the latest DCI message carrying ULCI by the first end time point and the timeline value. If the DCI message carrying ULCI arrives before the reference time point, the UE first performs an inter-UE cancellation, that is, the UE cancels an uplink transmission that completely or partially overlaps the time-frequency resources occupied by an uplink transmission of another UE and indicated by ULCI. If the DCI message carrying ULCI does not arrive before this reference time point, the UE performs cancellation in sequence of the arrival of the DCI messages (e.g., on a first-arrival-first-execution basis) or performs an intra-UE cancellation under an existing agreement.

Further, the method of determining, by the UE, the values of n and m includes at least one of the following:

(1) The values of n (e.g., $T_{pro,2}$, the time that the UE decodes DCI and prepares to send or cancels an uplink transmission) are pre-defined in the protocol;

(2) A set of candidate values of n is pre-defined in the protocol, and the UE determines a specific value according to its own capability;

(3) A fixed value k (e.g., $T_{pro,2}$, the time that the UE decodes DCI and prepares to send) is pre-defined in the protocol, and a set of candidate values of d1, which is the time that the UE cancels a UL transmission or prepares a channel (e.g., the time it takes for the UE to cancel a UL transmission or prepare a channel for a transmission), is pre-defined in the protocol, and the UE determines a value from the candidate value according to its own capability, and the specific values of n are determined after adding k value; and (4) The candidate values of n are predefined in the protocol and configured through RRC signaling to the UE.

In one example, the pre-defined values of n in the protocol may be the time it takes for the UE to decode DCI and prepare or cancel an uplink transmission. In one example, the fixed value k may be the time it takes for the UE to decode DCI and prepare a transmission.

Method 3:

In one example, a new timeline is defined in the protocol. In another example, a timeline that is defined in the current protocol can be used for the purpose of timing analysis based on the embodiments of the disclosed technology. In some implementations, a second timeline is set for timing analysis purposes, assuming that the second timeline is m symbols. The UE infers the reference time point for the latest DCI message carrying ULCI by a second end time point and the timeline value. If the DCI carrying ULCI arrives before the reference time point, the UE first performs an inter-UE cancellation, that is, the UE cancels an uplink transmission that completely or partially overlaps the time-frequency resources occupied by an uplink transmission of another UE and indicated by ULCI. If the DCI message carrying ULCI does not arrive before this reference time point, the UE performs cancellation in sequence of the arrival of the DCI messages (e.g., on a first-arrival-first-execution basis) or performs an intra-UE cancellation under an existing agreement.

Further, the method of determining, by the UE, the values of n and m includes at least one of the following:

(1) The values of m (e.g., $T_{pro,2}$, the time that the UE decodes DCI and prepares to send or cancels an uplink transmission) are pre-defined in the protocol;

(2) A set of candidate values of m is pre-defined in the protocol, and the UE determines a specific value according to its own capability;

(3) A fixed value k (e.g., $T_{pro,2}$, the time that the UE decodes DCI and prepares to send) is pre-defined in the protocol, and a set of candidate values of d2, which is the time that the UE cancels a UL transmission or prepares a channel (e.g., the time it takes for the UE to cancel a UL transmission or prepare a channel for a transmission), is pre-defined in the protocol, and the UE determines the value from the candidate value according to its own capability, and the specific values of m are determined after adding k value; and (4) The candidate values of m are predefined in the protocol and configured through RRC signaling to the UE.

In one example, the pre-defined values of m in the protocol may be the time it takes for the UE to decode DCI and prepare or cancel an uplink transmission. In one example, the fixed value k may be the time it takes for the UE to decode DCI and prepare a transmission.

The method of determining, by the UE, the first time end point includes at least one of the following:

(1) The first end time point is a first symbol or a first symbol of the part to be cancelled of the earliest uplink transmission among a group of uplink transmissions that at least partially overlap with one another;

(2) The first end time point is a first symbol or a first symbol of the part to be cancelled of the earliest uplink transmission in a group of uplink transmissions that at least partially overlap with one another and overlap with the RUR completely or partially;

(3) The first end time point is a first symbol or a first symbol of the part to be cancelled of the earliest high-priority uplink transmission among a group of uplink transmissions that at least partially overlap with one another;

(4) The first end time point is a first symbol or a first symbol of the part to be cancelled of the earliest high-priority uplink transmission in a group of uplink transmissions that at least partially overlap with one another and overlap with the RUR completely or partially;

(5) The first end time point is a first symbol or a first symbol of the part to be cancelled of the earliest high-priority PUSCH among a group of uplink transmissions that at least partially overlap with one another;

(6) The first end time point is a first symbol or a first symbol of the part to be cancelled of the earliest high-priority PUSCH in a group of uplink transmissions that at least partially overlap with one another and overlaps with the RUR completely or partially; and (7) The first end time point is a first symbol or a first symbol of the part to be cancelled of the earliest uplink transmission in a group of uplink transmissions that at least partially overlap with one another and completely or partially overlap a time-frequency resource indicated by the ULCI.

In an implementation, the overlapping uplink transmission group includes all uplink transmissions in the uplink transmission transmitted by the UE that completely or partially overlap with other uplink transmissions in the time domain. In another implementation, the overlapping uplink transmission group includes all the uplink transmissions that completely or partially overlap other uplink transmissions and the time-frequency resources occupied by an uplink transmission of another UE and indicated by ULCI that is considered as a high-priority uplink transmission.

The method of determining, by the UE, the second time end point includes at least one of the following:

(1) In a group of uplink transmissions that at least partially overlap with one another, the uplink transmission that completely or partially overlaps with the resource occupied by an uplink transmission of another UE and indicated by ULCI is recorded as A. The second time end point is a first symbol or a first symbol of the part to be cancelled of the earliest uplink transmission that completely or partially overlaps with the uplink transmission A and does not completely or partially overlap with the resource occupied by an uplink transmission of another UE and indicated by ULCI.

(2) In a group of uplink transmissions that at least partially overlap with one another, among the uplink transmissions that completely or partially overlap with the RUR, the uplink transmission that completely or partially overlaps with the resource occupied by an uplink transmission of another UE and indicated by ULCI is recorded as A. The second time end point is a first symbol or a first symbol of the part to be cancelled of the earliest uplink transmission that completely or partially overlaps with uplink transmission A and does not completely or partially overlap with the resource occupied by an uplink transmission of another UE and indicated by ULCI.

(3) The second time end point is a first symbol or a first symbol of the part to be cancelled of the uplink transmission that needs to be saved or restored in a group of uplink transmissions that at least partially overlap with one another.

The group of uplink transmissions may include all uplink transmissions transmitted by the UE that completely or partially overlap with other uplink transmissions in the time domain.

As shown in FIG. 2, the first end time point "b" is the first symbol of the first uplink transmission. The second end time point "c" is the first symbol of the second uplink transmission. The reference time point is pushed back to "a" by the UE, and DCI3 arrives before point "a," so the UE first performs an inter-UE cancellation.

Example 3

This embodiment describes a method for the UE to determine whether to resume the canceled transmission service.

The following further describes the implementation of the technical solution in detail with reference to the drawings.

As shown in FIG. 1, the UE transmits the first uplink transmission and the second uplink transmission. There are two cases of the priority of the two types of transmission services. The specific first uplink transmission has a higher priority than the second uplink transmission, or the priority of the first uplink transmission is the same as the priority of the second uplink transmission.

The first uplink transmission is one of the following:

(1) The earliest uplink transmission in the overlapping uplink transmission group is the first uplink transmission;

(2) In the overlapping uplink transmission group, the earliest uplink transmission that completely or partially overlaps with the RUR is the first uplink transmission;

(3) The earliest uplink transmission with high priority in the overlapping uplink transmission group is the first uplink transmission;

(4) In the overlapping uplink transmission group, the earliest uplink transmission with high priority that completely or partially overlap with the RUR is the first uplink transmission;

(5) The earliest PUSCH with high priority in the over-lapping uplink transmission group is the first uplink transmission;

(6) In the overlapping uplink transmission group, the earliest PUSCH with high priority that completely or partially overlap with the RUR is the first uplink transmission; and (7) In the overlapped uplink transmission group, the earliest uplink transmission that completely or partially overlaps with the resource indicated by ULCI is the first uplink transmission.

The second uplink transmission service is one of the following:

(1) In the overlapping uplink transmission group, the uplink transmission that completely or partially over-laps with the resource indicated by ULCI is recorded as A, and the earliest uplink transmission that completely or partially overlaps with the uplink transmission A and does not completely or partially overlap with the resource indicated by ULCI is the second uplink trans-mission;

(2) In the overlapped uplink transmission group, in the uplink transmission that completely or partially over-laps with the RUR, the uplink transmission that com-pletely or partially overlaps with the resource indicated by ULCI is recorded as A, and the uplink transmission that completely or partially overlaps with the uplink transmission A. The earliest uplink transmission that does not completely or partially overlap with the resource indicated by ULCI is the second uplink trans-mission; and (3) In the overlapping uplink transmission group, the earliest uplink transmission that needs to be saved or restored is the second uplink transmission.

The overlapping uplink transmission group includes all uplink transmissions in the uplink transmission from the UE that completely or partially overlap with other uplink trans-missions in the time domain. In another implementation, the overlapping uplink transmission group includes all the uplink transmissions that completely or partially overlap with other uplink transmissions and the time-frequency resources occupied by an uplink transmission of another UE and indicated by ULCI that is considered as a high-priority uplink transmission.

Further, DCI1 schedules the first uplink transmission, and DCI2 message carries ULCI, where the ULCI indicates the time-frequency resources that the third uplink transmission of other terminals need to occupy in the RUR. The first uplink transmission and the second uplink transmission completely or partially overlap in the time domain, and the first uplink transmission and the third uplink transmission completely or partially overlap in the time-frequency domain. According to the service conflict cancellation rule in an intra-UE prioritization/multiplexing mechanism which has been agreed, the UE cancels the second uplink trans-mission. A method for the UE to determine whether to resume the second uplink transmission channel includes at least one of the following:

Method 1:

The UE determines whether to resume the second uplink transmission channel according to the number of symbols in a time frame between the last symbol of the DCI message carrying ULCI and a first symbol of the earliest uplink transmission.

If the UE resumes the second uplink transmission chan-nel, the UE expects that the first symbol of the earliest channel carrying the first uplink transmission and the second uplink transmission satisfies the following time axis condi-tions:

(1) There are no less than n symbols between the last symbol of the DCI message carrying ULCI and the first symbol of the earliest channel carrying the first uplink transmission channel, that is, t0 is no less than n, and the first uplink transmission completely or partially overlaps with the third uplink transmission; and (2) There are no less than m symbols between the last symbol of the DCI message carrying ULCI and the first symbol of the earliest channel carrying the second uplink transmission channel, that is, t1 is no less than m, and the second uplink transmission completely or partially overlaps with the second uplink transmission and does not completely or partially overlap with the third uplink transmission.

Method 2:

The UE is determined according to the number of symbols in a time frame between the last symbol of the DCI carrying ULCI and a first symbol of the earliest first uplink transmission.

The UE resumes the second uplink transmission channel. The UE expects that the first symbol of the earliest channel carrying the first uplink transmission satisfies the following time axis conditions:

There are no less than n symbols between the last symbol of the DCI message carrying ULCI and the first symbol of the earliest channel carrying the first uplink transmission channel, that is, t0 is no less than n, and the uplink transmission completely or partially overlaps with the third uplink transmission.

Method 3:

The UE determines according to the number of symbols in a time frame between the last symbol of the DCI message carrying ULCI and a first symbol of the earliest second uplink transmission channel.

The UE resumes the second uplink transmission channel. The UE expects that the first symbol of the earliest channel carrying the second uplink transmission meets the following time axis conditions:

There are no less than m symbols between the last symbol of the DCI message carrying ULCI and a first symbol of the earliest channel carrying the second uplink transmission, that is, t1 is no less than m, and the uplink transmission completely or partially overlaps with the second uplink transmission and does not completely or partially overlap with the third uplink transmission.

Further, the method for determining n, m includes at least one of the following:

(1) The values of m (e.g., $T_{pro,2}$, the time that the UE decodes DCI and prepares to send or cancels an uplink transmission) are pre-defined in the protocol;

(2) A set of candidate values of m is pre-defined in the protocol, and the UE determines a specific value according to its own capability;

(3) A fixed value k (e.g., $T_{pro,2}$, the time that the UE decodes DCI and prepares to send) is pre-defined in the protocol, and a set of candidate values of d2, which is the time that the UE cancels a UL transmission or prepares a channel (e.g., the time it takes for the UE to cancel a UL transmission or prepare a channel for a transmission), is pre-defined in the protocol, and the UE determines the value from the candidate value according to its own capability, and the specific values of m are determined after adding k value; and (4) The candidate values of m or n are predefined in the protocol and configured through RRC signaling to the UE.

Example 4

This embodiment describes a method for the UE to determine whether to cancel all transmission services that conflict with ULCI indication resources.

Figure 3:
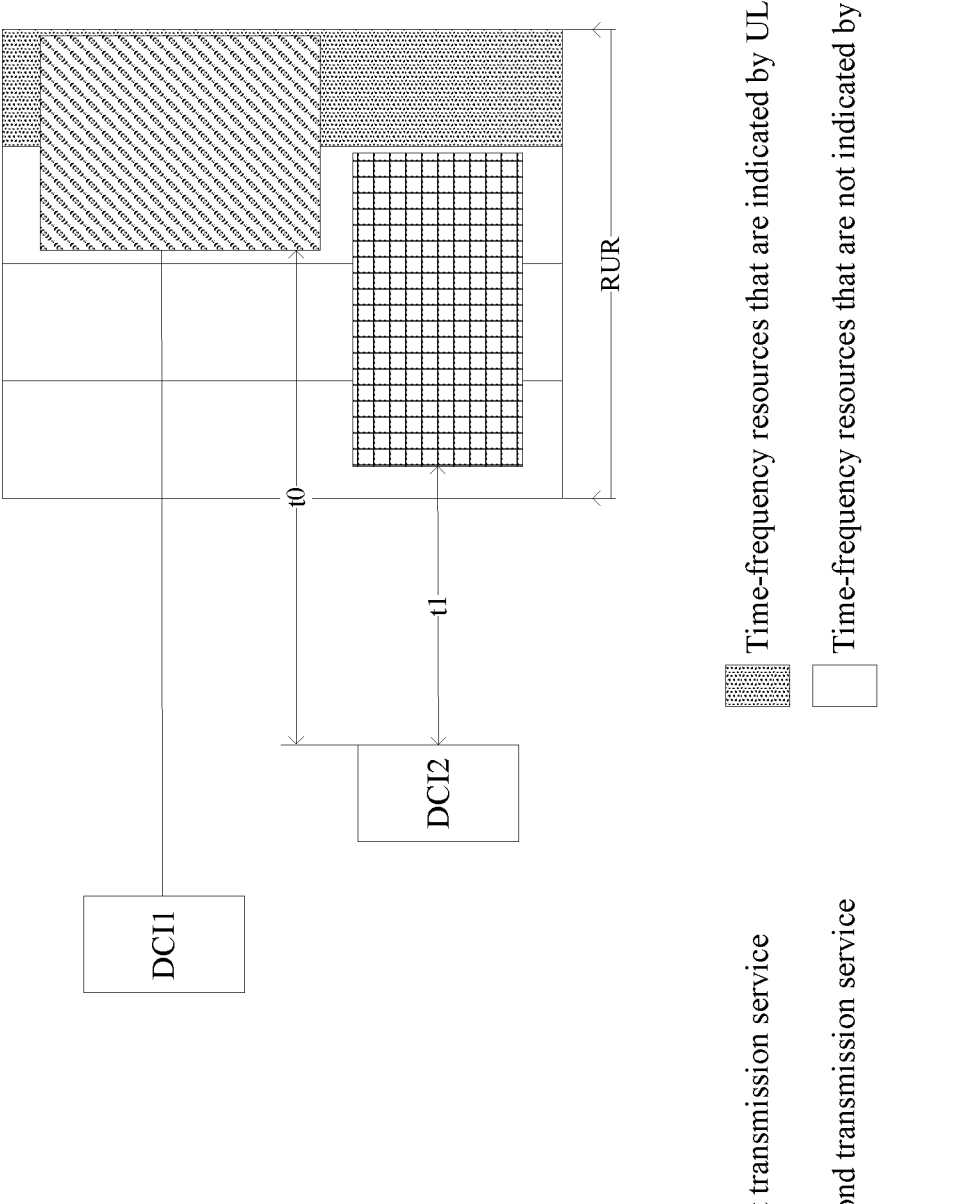
FIG. 3 depicts another example of time-frequency domain resources in which uplink transmissions are scheduled according to control information messages including downlink control information (DCI), based on some example embodiments of the disclosed technology.

FIG. 3 depicts an example of time-frequency domain resources in which uplink transmissions are scheduled according to control information messages including downlink control information (DCI), based on some example embodiments of the disclosed technology.

As shown in FIG. 3, the UE transmits the first uplink transmission and the second uplink transmission. There are two cases of the priority of the two types of transmission services. The specific first uplink transmission has a higher priority than the second uplink transmission, or the priority of the first uplink transmission is the same as the priority of the second uplink transmission. DCI1 schedules the first uplink transmission, DCI2 message carries ULCI, and the ULCI indicates the time-frequency resources that the third uplink transmission of other terminals need to occupy in the RUR. The first uplink transmission and the second uplink transmission completely or partially overlap in the time domain, and the first uplink transmission and the third uplink transmission completely or partially overlap in the time-frequency domain. A method for the UE to cancel transmitting the first uplink transmission channel includes at least one of the following:

Method 1:

The cancellation behavior of the UE is explicitly indicated by 1 bit. An indication field is introduced, and the indication field contains an indication bit. When the indication bit value is 0, the UE cancels the first transmission channel conflicting with and after the third uplink transmission. When the indication bit value is 1, the UE cancels the entire first uplink transmission channel. The indication bit may be indicated by higher-layer signaling configuration or physical layer signaling.

Method 2:

The cancellation behavior of the UE is explicitly indicated by 1 bit. An indication field is introduced, and the indication field contains an indication bit. When the indication bit value is 1, the UE cancels the first transmission channel conflicting with and after the third uplink transmission. When the indication bit value is 0, the UE cancels the entire first uplink transmission channel. The indication bit may be indicated by higher-layer signaling configuration or physical layer signaling.

Method 3:

The UE determines the cancellation behavior according to the proportion of the resource of the first transmission occupied by the time-frequency resources indicated by the ULCI. In some embodiments of the disclosed technology, an indication threshold P is introduced, and the UE calculates the actual value p. Specifically, the number of resource blocks (Resource Blocks, RBs) occupied by the resources occupied by the ULCI in the first uplink is $$N_1^{num},$$

$$Np = \frac{N_o^{num1}}{N_1^{num}}.$$

When the specific gravity value p>P, the UE cancels the entire first uplink transmission channel. When the proportion value p≤, the UE cancels the first transmission channel conflicting with and after the third uplink transmission.

The indication threshold P may be predefined by a protocol, or a candidate value of the protocol predefined P is configured by high-level signaling, or a candidate value of a high-level signaling configuration is indicated by physical layer signaling.

Method 4:

The UE determines the cancellation behavior according to the proportion of the resource of the first transmission multiplexing the information loaded by the second transmission occupied by the time-frequency resources indicated by ULCI. An indication threshold P is introduced, and the UE calculates the actual value p. Specifically, the ULCI indicates that the number of RBs of the time-frequency domain resources multiplexed on the first transmission with the resources occupied by the second transmission bearer is $$N_o^{num2}.$$

The number of RBs of the time-frequency domain resources that the information is multiplexed on the first transmission is $$N_2^{num},$$

$$p = \frac{N_o^{num2}}{N_1^{num}}.$$

When the specific gravity value p>P, the UE cancels the entire first uplink transmission channel. When the specific gravity value p≤P, the first transmission channel conflicting with and after the third uplink transmission.

The indication threshold P may be predefined by a protocol, or a candidate value of the protocol predefined P is configured by high-level signaling, or a candidate value of a high-level signaling configuration is indicated by physical layer signaling.

Example 5

If multiple sub-slot based physical uplink control channels (PUCCH) are configured in a slot, and another slot based PUCCH or physical uplink shared channel (PUSCH) and configured in the same slot. At least one sub-slot based PUCCH conflict with slot based PUCCH/PUSCH in the time domain, which is shown in FIG. 4.

Figure 4:
FIG. 4 depicts multiple time slot-based PUCCH/PUSCH resources based on some example embodiments of the disclosed technology.

FIG. 4 depicts slot based PUCCH/PUSCH based on some example embodiments of the disclosed technology.

The PUCCH in FIG. 4 can carry Hybrid Automatic Repeat Request Acknowledgement (HARQ-ACK) information, Scheduling Request (SR), or Channel State Information (CSI), and PUSCH can carry CSI or data information. This embodiment is not limited to a scenario that PUCCH/PUSCH conflicts with all sub-slot based PUCCHs in a slot, and the conflicting channel priorities may be the same or different from one another.

The method for dealing with this conflict includes at least one of the following methods:

Method 1:

The slot based PUCCH/PUSCH and the conflicting first sub-slot based PUCCH meeting timeline are multiplexed according to an existing method. If the conflict still exists after these two channels are multiplexed, the channel after multiplexing is transmitted and the remaining sub-slot based PUCCH(s) is dropped, or the slot based PUCCH/PUSCH is dropped and all sub-slot based PUCCHs are transmitted.

Method 2:

The slot based PUCCH/PUSCH and the conflicting first sub-slot based PUCCH meeting timeline and using PUCCH format 0, PUCCH format 2, PUCCH format 3, or PUCCH format 4 (non-PUCCH format 1) are multiplexed according to an existing method. If all the sub-slot based PUCCHs use PUCCH format 1, the slot based PUCCH/PUSCH is dropped and all sub-slot based PUCCHs are transmitted, or the slot based PUCCH/PUSCH is transmitted and all sub-slot based PUCCHs are dropped.

Method 3:

If the slot based PUCCH uses PUCCH format 1 and carries SR information, the slot based PUCCH/PUSCH and the conflicting first sub-slot based PUCCH meeting timeline and using PUCCH format 0, PUCCH format 2, PUCCH format 3, or PUCCH format 4 (non-PUCCH format 1) are multiplexed according to an existing method. If all the sub-slot based PUCCHs that conflict with the slot based PUCCH carrying SR use PUCCH format 1, the slot based PUCCH/PUSCH is dropped and all sub-slot based PUCCHs are transmitted, or the slot based PUCCH/PUSCH is transmitted and all sub-slot based PUCCHs are dropped.

Method 4:

If the slot based PUCCH uses PUCCH format 1 and carries SR information, the slot based PUCCH/PUSCH and the conflicting first sub-slot based PUCCH meeting timeline and using PUCCH format 0, PUCCH format 2, PUCCH format 3, or PUCCH format 4 (non-PUCCH format 1) are multiplexed according to an existing method. If all the sub-slot based PUCCHs use format 1, the slot based PUCCH/PUSCH is dropped and all sub-slot based PUCCHs are transmitted, or the slot based PUCCH/PUSCH is transmitted and all sub-slot based PUCCHs are dropped.

Figure 5:
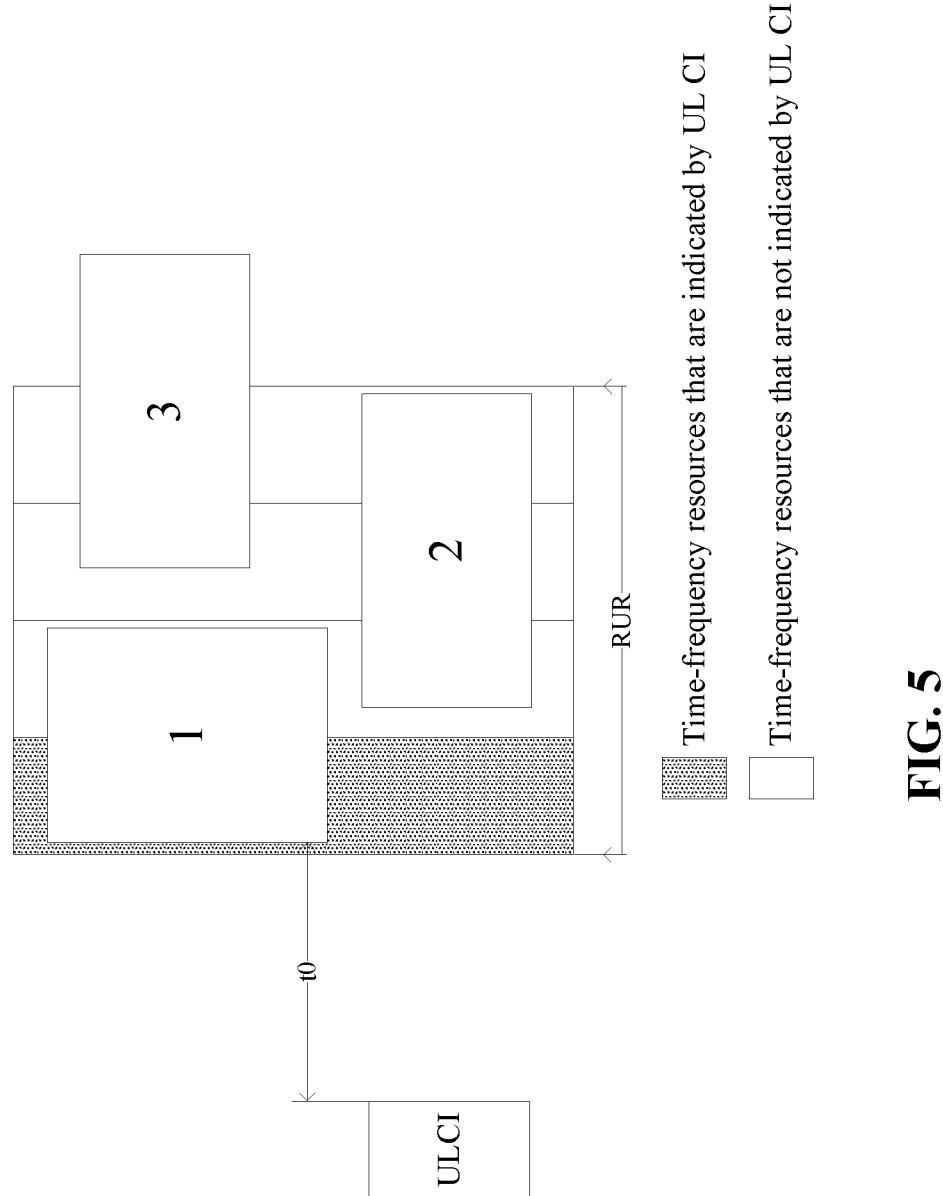
FIG. 5 depicts an example of timing analysis on control an information message including a transmission cancellation indication, based on some example embodiments of the disclosed technology.

FIG. 5 depicts an example of timing analysis on control an information message including a transmission cancellation indication, based on some example embodiments of the disclosed technology.

In some implementations, a start time point of t0 may be at the last symbol of a DCI message that carries the ULCI indication. In other implementations, the start time point of t0 may be at the last symbol of the last DCI message in a group of DCIs that the UE can respond to. This group of DCI messages include the DCI messages that schedule the first, second and third transmissions (1, 2, and 3) and the DCI message that carries the ULCI indication.

Figure 6:
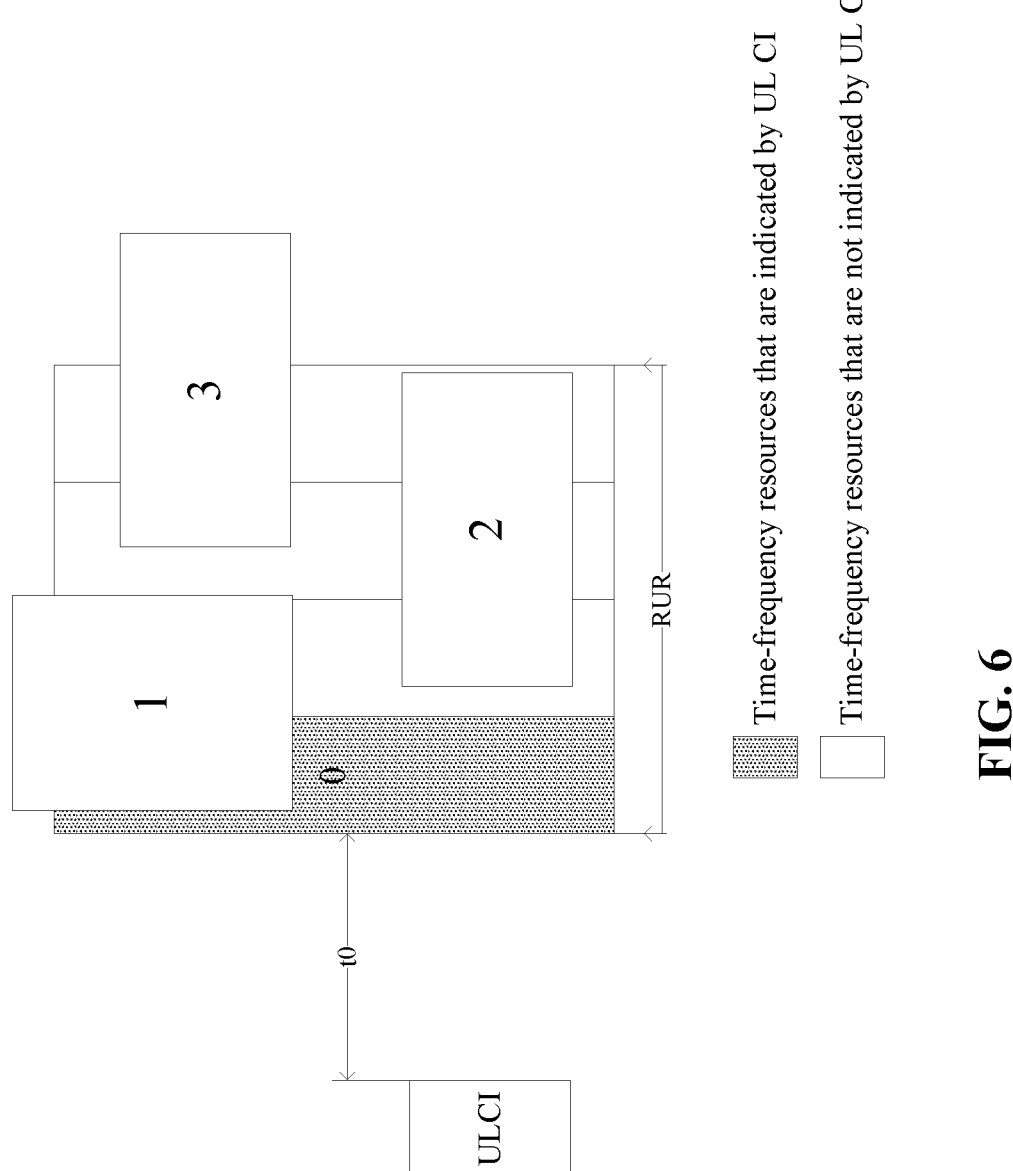
FIG. 6 depicts another example of timing analysis on control an information message including a transmission cancellation indication, based on some example embodiments of the disclosed technology.

FIG. 6 depicts another example of timing analysis on control an information message including a transmission cancellation indication, based on some example embodiments of the disclosed technology.

In some implementations, an end time point of t0 may be at the first symbol of the uplink transmission that arrives first in the overlapping uplink transmission group. In other implementations, the end time point of t0 may be at the first symbol of the first uplink transmission that overlaps with the RUR in the overlapping uplink transmission group.

Figure 7:
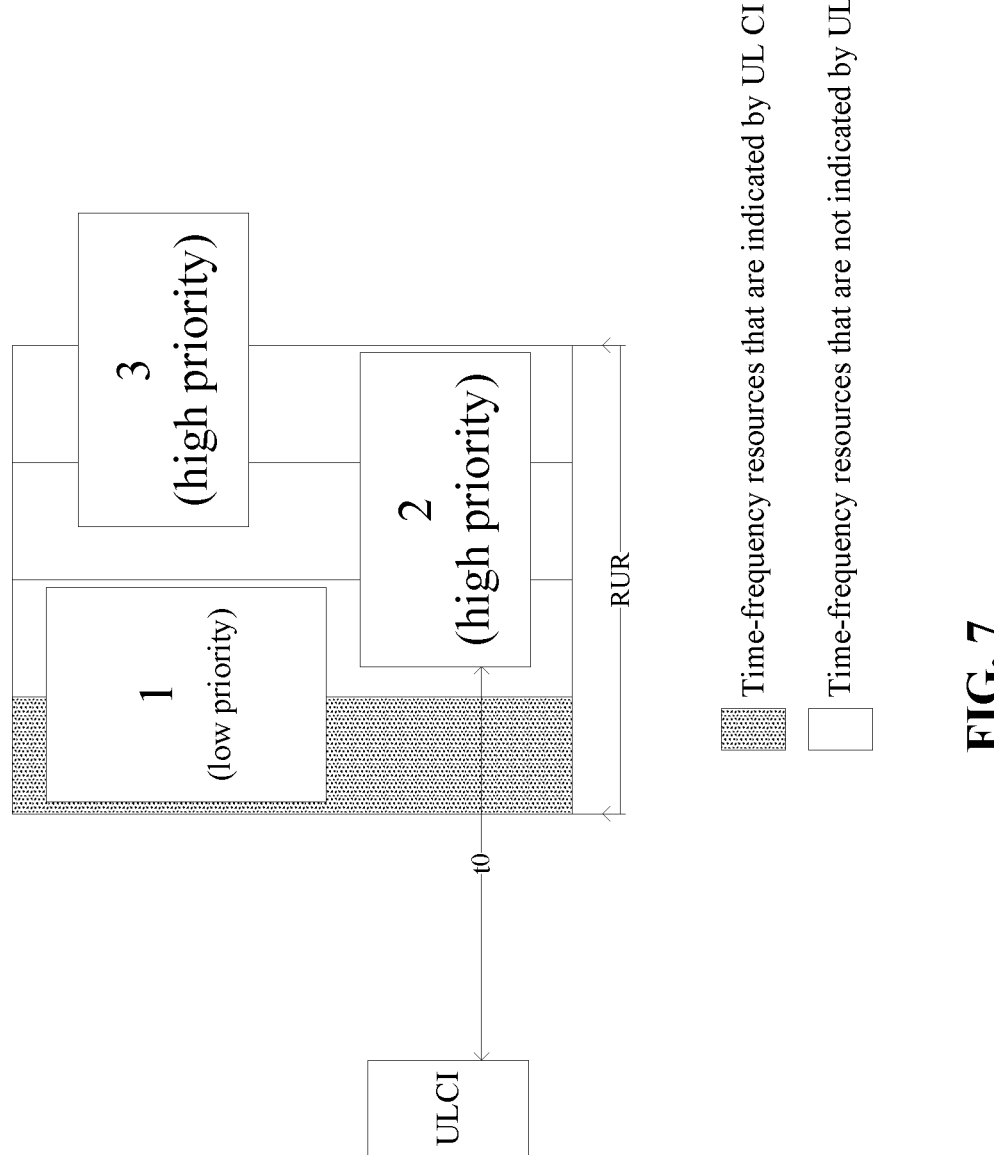
FIG. 7 depicts another example of timing analysis on control an information message including a transmission cancellation indication, based on some example embodiments of the disclosed technology.

FIG. 7 depicts another example of timing analysis on control an information message including a transmission cancellation indication, based on some example embodiments of the disclosed technology.

In some implementations, the end time point of t0 may be at the first symbol of the high-priority uplink transmission that arrives first in the overlapping uplink transmission group.

Figure 8:
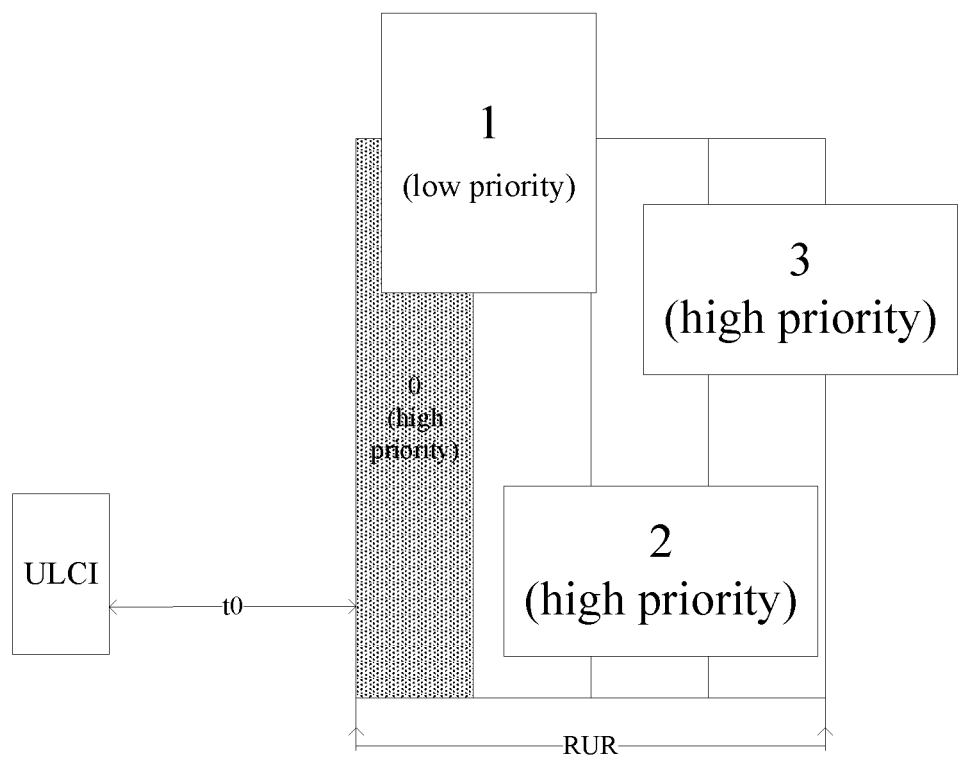
FIG. 8 depicts another example of timing analysis on control an information message including a transmission cancellation indication, based on some example embodiments of the disclosed technology.

FIG. 8 depicts another example of timing analysis on control an information message including a transmission cancellation indication, based on some example embodiments of the disclosed technology.

In some implementations, the end time point of t0 may be at the first symbol of the highest-priority uplink transmission that overlaps with the RUR in the in the overlapping uplink transmission group.

Figure 9:
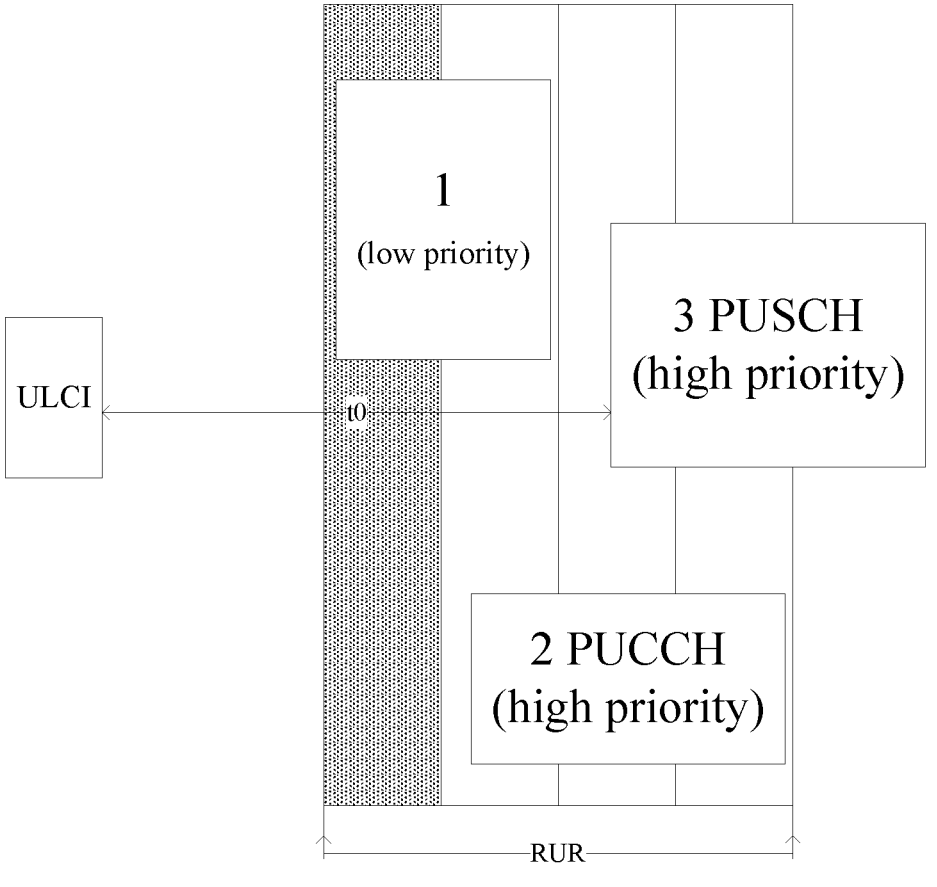
FIG. 9 depicts another example of timing analysis on control an information message including a transmission cancellation indication, based on some example embodiments of the disclosed technology.

FIG. 9 depicts another example of timing analysis on control an information message including a transmission cancellation indication, based on some example embodiments of the disclosed technology.

In some implementations, the end time point of t0 may be at the first symbol of the high-priority PUSCH that arrives first in the overlapping uplink transmission group.

Figure 10:
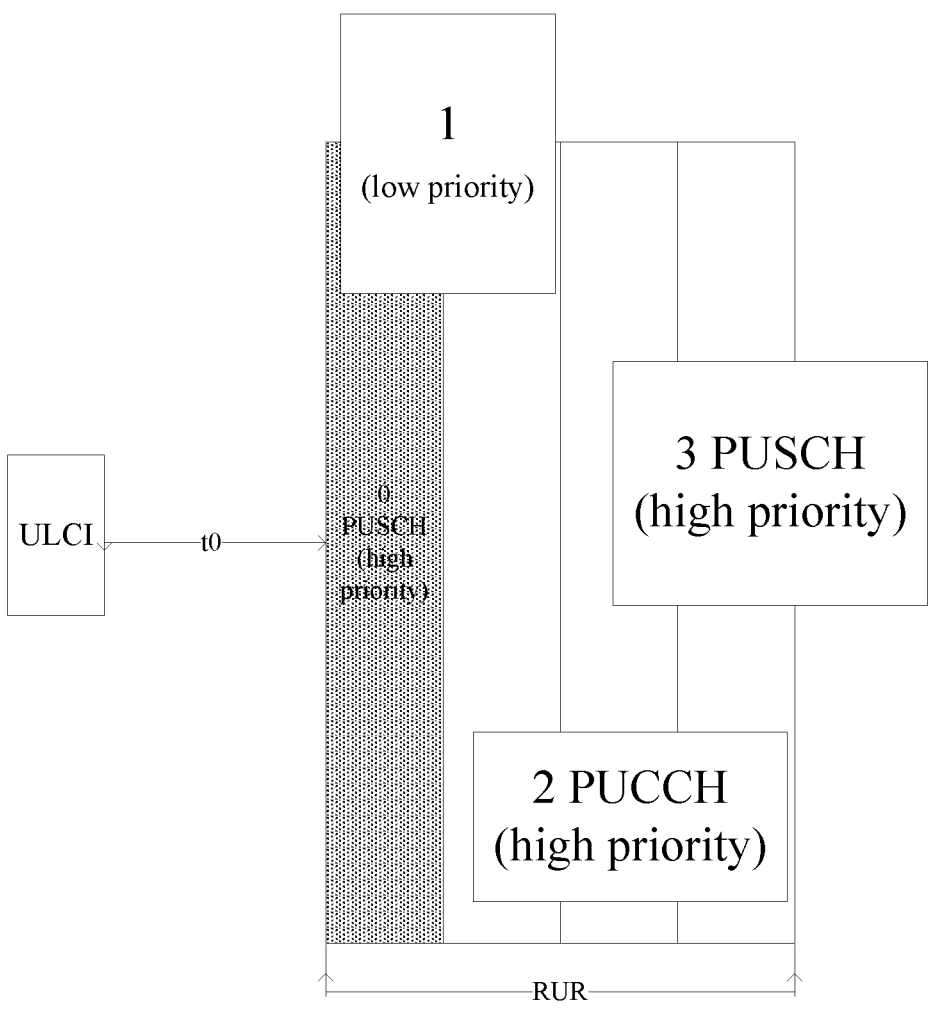
FIG. 10 depicts another example of timing analysis on control an information message including a transmission cancellation indication, based on some example embodiments of the disclosed technology.

FIG. 10 depicts another example of timing analysis on control an information message including a transmission cancellation indication, based on some example embodiments of the disclosed technology.

In some implementations, the end time point of t0 may be at the first symbol of the highest-priority PUSCH that overlaps with the RUR in the overlapping uplink transmission group.

Figure 11:
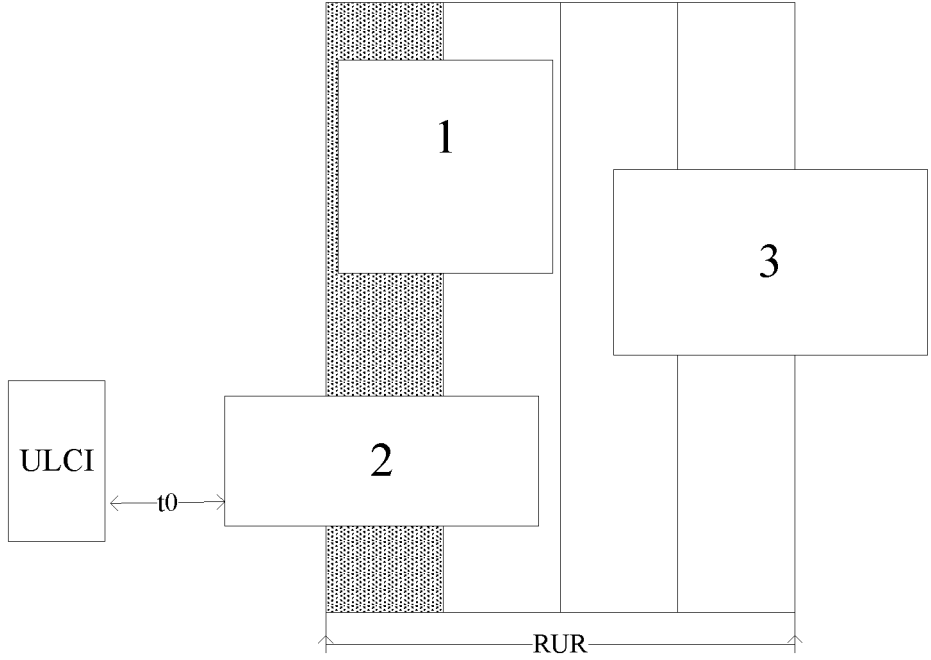
FIG. 11 depicts another example of timing analysis on control an information message including a transmission cancellation indication, based on some example embodiments of the disclosed technology.

FIG. 11 depicts another example of timing analysis on control an information message including a transmission cancellation indication, based on some example embodiments of the disclosed technology.

In some implementations, the end time point of t0 may be at The first symbol of the first uplink transmission that overlaps with ULCI to indicate the cancellation of resource overlap in uplink transmissions with overlap.

In other implementations, the end time point of t0 may be at The first symbol of the first uplink transmission that overlaps with the RUR and overlaps with the ULCI indication to cancel the overlap of uplink transmissions.

Figure 12:
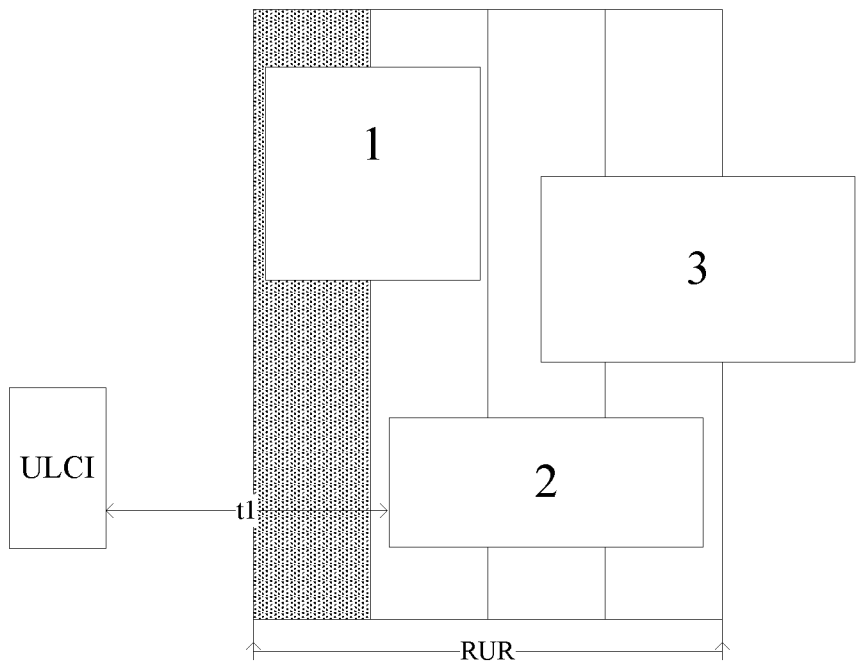
FIG. 12 depicts another example of timing analysis on control an information message including a transmission cancellation indication, based on some example embodiments of the disclosed technology.

FIG. 12 depicts another example of timing analysis on control an information message including a transmission cancellation indication, based on some example embodiments of the disclosed technology.

In some implementations, a start time point of t1 may be at the last symbol of DCI message carrying ULCI indication.

In some implementations, the start time point of t1 may be at the last symbol of the last DCI message that the UE can respond to, which is equivalent to the last DCI message in a group of DCIs. This group of DCI messages include the DCI messages that schedule the first, second and third transmissions (1, 2, and 3) and the DCI message that carries the ULCI indication.

In some implementations, an end time point of t1 may be at In uplink transmissions with overlap, the first uplink transmission that overlaps with the ULCI indication resource is 1, and the first symbol of the first uplink transmission that overlaps with 1 and does not overlap with the ULCI indication resource In some implementations, the end time point of t1 may be at In the uplink transmission that overlaps, the first uplink transmission that overlaps with the RUR, that overlaps with the ULCI indicator resource is 1, and the first uplink transmission that overlaps with 1 and does not overlap with the ULCI indicator resource, Symbols In some implementations, the sequence of execution by the UE is as follows:

First, The UE judges that the timeline is satisfied, and performs cancellation of the inter UE first; if not, the corresponding operation is performed according to the DCI arrival order.

Second, The UE determines the timeline end point. This end point is the starting point of some uplink transmission. Based on this point, the length of the timeline is inferred. The UE waits until the inferred point. If ULCI is received, the UE cancels the inter UE first. Execute according to DCI arrival order.

FIG. 13 depicts an example of a wireless communication method based on some embodiments of the disclosed technology.

In some embodiments of the disclosed technology, a wireless communication method includes, at 1310, receiving, by a first wireless device, one or more control information messages, at least one of the control information messages including a transmission cancellation indication indicating that a transmission previously scheduled for the first wireless device is to be cancelled, and, at 1320, performing, by the first wireless device, a timing analysis on the at least one of the control information messages including the transmission cancellation indication.

In some implementations, the timing analysis includes determining, by the first wireless device, timeline information based on the one or more control information messages and uplink transmissions scheduled by the control information or corresponding to a configured grant, and determining, by the first wireless device, whether the timeline information satisfies a predetermined condition.

In some implementations, the timing analysis includes determining, by the first wireless device, a reference time point based on a first symbol of each of uplink transmissions scheduled by the one or more control information messages, and comparing, by the first wireless device, the reference time point with an arrival timing of the at least one control information message including a transmission cancellation indication indicating that a transmission previously scheduled for the first wireless device is to be cancelled.

FIG. 14 depicts an example of a wireless communication method based on some embodiments of the disclosed technology.

In some embodiments of the disclosed technology, a wireless communication method includes, at 1410, receiving, by a first wireless device, one or more message comprising a transmission cancellation indication indicating that a transmission previously scheduled for the first wireless device is to be cancelled, and, at 1420, implementing, by the first wireless device, the transmission cancellation using one of multiple cancellation modes according to a condition associated with the first wireless device.

Figure 15:
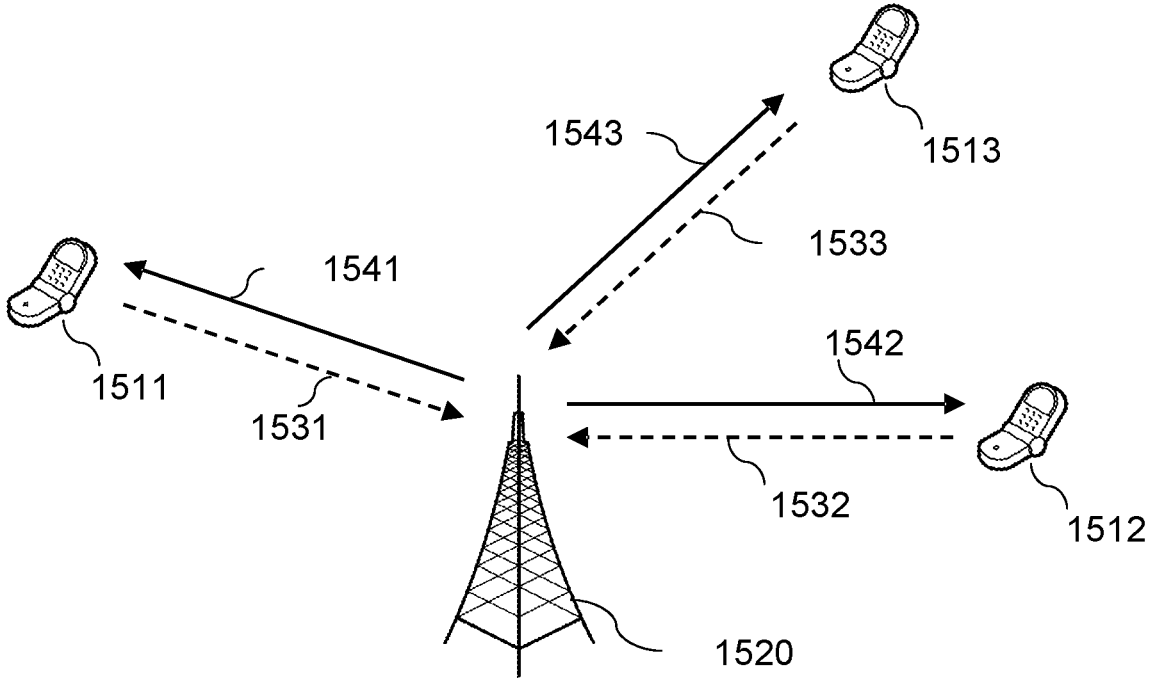
FIG. 15 shows an example of a wireless communication system.

FIG. 15 shows an example of a wireless communication system (e.g., an LTE, 5G New Radio (NR) cellular network) that includes a radio access node 1520 and one or more user equipment (UE) 1511, 1512 and 1513. In some embodiments, the downlink transmissions (1541, 1542, 1543) include a control plane message that comprises a processing order for processing the plurality of user plane functions. This may be followed by uplink transmissions (1531, 1532, 1533) based on the processing order received by the UEs. Similarly, the user plane functions can be processed by UEs for downlink transmissions based on the processing order received. The UE may be, for example, a smartphone, a tablet, a mobile computer, a machine to machine (M2M) device, a terminal, a mobile device, an Internet of Things (IoT) device, and so on.

This patent document uses examples from the 3GPP New Radio (NR) network architecture and 5G protocol only to facilitate understanding and the disclosed techniques and embodiments may be practiced in other wireless systems that use different communication protocols than the 3GPP protocols.

Figure 16:
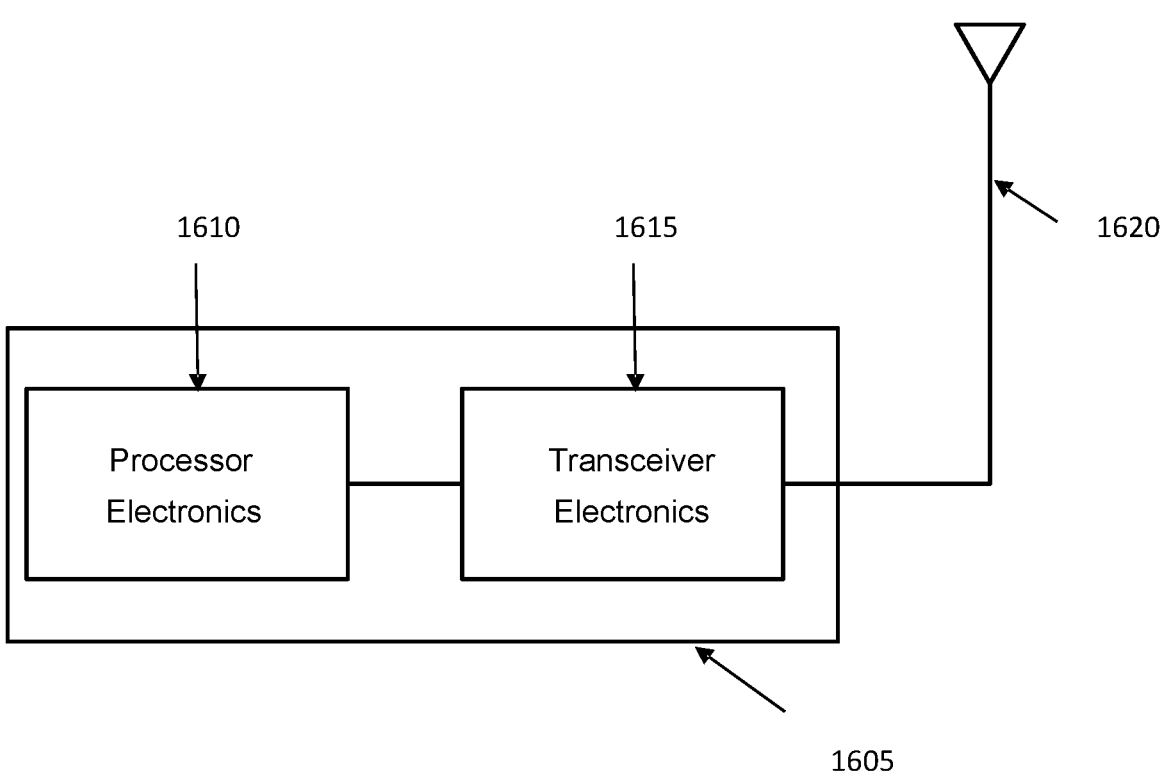
FIG. 16 is a block diagram representation of a portion of a radio station based on one or more embodiments of the disclosed technology can be applied.

FIG. 16 is a block diagram representation of a portion of a radio station based on one or more embodiments of the disclosed technology can be applied. A radio station 1605 such as a base station or a wireless device (or UE) can include processor electronics 1610 such as a microprocessor that implements one or more of the wireless techniques presented in this document. The radio station 1605 can include transceiver electronics 1615 to send and/or receive wireless signals over one or more communication interfaces such as antenna 1620. The radio station 1605 can include other communication interfaces for transmitting and receiving data. Radio station 1605 can include one or more memories (not explicitly shown) configured to store information such as data and/or instructions. In some implementations, the processor electronics 1610 can include at least a portion of the transceiver electronics 1615. In some embodiments, at least some of the disclosed techniques, modules or functions are implemented using the radio station 1605.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A wireless communication method, comprising: receiving, by a first wireless device, one or more control information messages, at least one of the control information messages including a transmission cancellation indication indicating that a transmission previously scheduled for the first wireless device is to be cancelled; and performing, by the first wireless device, a timing analysis on the at least one of the control information messages including the transmission cancellation indication.

Clause 2. The method of clause 1, further comprising: determining, by the first wireless device, whether to cancel a transmission overlapping with a time-frequency resource indicated by the transmission cancellation indication at least according to the timing analysis.

Clause 3. The method of clause 1, wherein the timing analysis includes: determining, by the first wireless device, timeline information based on the one or more control information messages and uplink transmissions scheduled by the control information or corresponding to a configured grant; and determining, by the first wireless device, whether the timeline information satisfies a predetermined condition.

Clause 4. The method of clause 3, wherein the timeline information includes at least one of first and second time differences, and wherein: the first time difference is a time difference between a first time point and a second time point in a time domain, the first time point being determined based on the one or more control information messages, the second time point being determined based on the uplink transmissions scheduled by the control information or corresponding to the configured grant; the second time difference is a time difference between a third time point and a fourth time point in the time domain, the third time point being determined based on the one or more control information messages, the fourth time point being determined based on the uplink transmissions scheduled by the control information or corresponding to the configured grant, the fourth time point being different from the second time point.

Clause 5. The method of clause 4, wherein the first time point is at a last symbol of the control information message that includes the uplink cancellation information.

Clause 6. The method of clause 4, wherein the third time point is at a last symbol of the control information message that includes the uplink cancellation information.

Clause 7. The method of clause 4, wherein the first time point is at a last symbol of the last control information message that the first wireless device is operable to respond to.

Clause 8. The method of clause 4, wherein the third time point is at a last symbol of the last control information message that the first wireless device is operable to respond to.

Clause 9. The method of clause 4, wherein the second time point is at a first symbol or a first symbol of the part to be cancelled of the earliest uplink transmission among a group of uplink transmissions that at least partially overlap with one another.

Clause 10. The method of clause 4, wherein the second time point is at a first symbol or a first symbol of the part to be cancelled of the earliest uplink transmission with a high priority among a group of uplink transmissions that at least partially overlap with one another.

Clause 11. The method of clause 4, wherein the second time point is at a first symbol or a first symbol of the part to be cancelled of the earliest physical uplink shared channel (PUSCH) with a high priority among a group of uplink transmissions that at least partially overlap with one another.

Clause 12. The method of clause 4, wherein the second time point is at a first symbol or a first symbol of the part to be cancelled of the earliest uplink transmission among a group of uplink transmissions that at least partially overlap with one another, the group of uplink transmissions overlapping with a time-frequency resource indicated by the transmission cancellation indication.

Clause 13. The method of clause 4, wherein the fourth time point is at a first symbol or a first symbol of the part to be cancelled of the earliest uplink transmission among a group of uplink transmissions that at least partially overlap with one another, wherein the group of uplink transmissions overlaps at least one uplink transmission that overlaps with a time-frequency resource indicated by the transmission cancellation indication, and wherein the group of uplink transmissions does not overlap with the time-frequency resource indicated by the transmission cancellation indication.

Clause 14. The method of clause 4, wherein the fourth time points is at a first symbol or a first symbol of the part to be cancelled of the earliest uplink transmission among a group of uplink transmissions that at least partially overlap with one another, and wherein the earliest uplink transmission is to be saved or restored.

Clause 15. The method of clause 1, wherein the timing analysis includes: determining, by the first wireless device, a reference time point based on a first symbol or a first symbol of the part to be cancelled of each of uplink transmissions scheduled by the one or more control information messages; and comparing, by the first wireless device, the reference time point with an arrival timing of at least one control information message.

Clause 16. The method of clause 15, further comprising: determining, by the first wireless device, whether to cancel a transmission overlapping with a time-frequency resource indicated by the transmission cancellation indication at least according to the comparison result.

Clause 17. The method of clause 15, wherein the reference time point is derived from a second time point and a fourth time point determined based on the uplink transmissions scheduled by the one or more control information messages or corresponding to the configured grant.

Clause 18. The method of clause 17, wherein the second time point is at a first symbol or a first symbol of the part to be cancelled of the earliest uplink transmission among a group of uplink transmissions that at least partially overlap with one another.

Clause 19. The method of clause 17, wherein the second time point is at a first symbol or a first symbol of the part to be cancelled of the earliest uplink transmission with a high priority among a group of uplink transmissions that at least partially overlap with one another.

Clause 20. The method of clause 17, wherein the second time point is at a first symbol or a first symbol of the part to be cancelled of the earliest physical uplink shared channel (PUSCH) with a high priority among a group of uplink transmissions that at least partially overlap with one another.

Clause 21. The method of clause 17, wherein the second time point is at a first symbol or a first symbol of the part to be cancelled of the earliest uplink transmission among a group of uplink transmissions that at least partially overlap with one another, the group of uplink transmissions overlapping with a time-frequency resource indicated by the transmission cancellation indication.

Clause 22. The method of clause 17, wherein the fourth time point is at a first symbol or a first symbol of the part to be cancelled of the earliest uplink transmission among a group of uplink transmissions that at least partially overlap with one another, wherein the group of uplink transmissions overlaps an uplink transmission that overlaps with a time-frequency resource indicated by the transmission cancellation indication, and wherein the group of uplink transmissions does not overlap with the time-frequency resource indicated by the transmission cancellation indication.

Clause 23. The method of clause 17, wherein the fourth time points is at a first symbol or a first symbol of the part to be cancelled of the earliest uplink transmission among a group of uplink transmissions that at least partially overlap with one another, and wherein the earliest uplink transmission is to be saved or restored.

Clause 24. The method of any of clauses 9-14 and 18-23, wherein the group of uplink transmissions includes at least one of physical uplink shared channel (PUSCH), physical uplink control channel (PUCCH), or a time-frequency resource indicated by the transmission cancellation indication that is regarded as a normal uplink transmission.

Clause 25. The method of any of clauses 1-24, further comprising performing a cancellation of scheduled transmissions based on the timing analysis or the comparison result.

Clause 26. The method of clause 25, wherein the performing a cancellation of scheduled transmissions based on the timing analysis or the comparison result includes, upon determination that the timeline information satisfies the predetermined condition, prioritizing, by the first wireless device, cancellation of the uplink transmissions based on the timing analysis.

Clause 27. The method of clause 26, wherein the prioritizing cancellation of the uplink transmissions includes, upon determination that the time difference satisfies the predetermined condition, performing an inter-UE cancellation to first cancel an uplink transmission that at least partially overlaps a time-frequency resource indicated by the transmission cancellation indication.

Clause 28. The method of clause 27, wherein the prioritizing cancellation of the uplink transmissions includes, upon determination that the time difference fails to satisfy the predetermined condition, performing cancellation of the uplink transmissions in sequence of the arrival of the messages or first canceling an uplink transmission that at least partially overlaps one or more high-priority physical uplink shared channels (PUSCH).

Clause 29. The method of clause 27, wherein the time difference determined by the first wireless device based on the first time point and the second time point or the third time point and the fourth time point.

Clause 30. The method of clause 26, wherein the prioritizing cancellation of the uplink transmissions includes, upon determination that both the first and second time differences satisfy the predetermined condition, performing an inter-UE cancellation to first cancel an uplink transmission that at least partially overlaps a time-frequency resource indicated by the transmission cancellation indication.

Clause 31. The method of clause 30, wherein the prioritizing cancellation of the uplink transmissions includes, upon determination that both the first and second timeline differences fail to satisfy the predetermined condition, performing cancellation of the uplink transmissions in sequence of the arrival of the messages or first canceling an uplink transmission that at least partially overlaps one or more high priority-physical uplink shared channels (PUSCH).

Clause 32. The method of clause 26, wherein the prioritizing cancellation of the uplink transmissions includes, upon determination that the arrival timing of the second control information message precedes the reference time point, performing an inter-UE cancellation to first cancel an uplink transmission that at least partially overlaps a time-frequency resource indicated by the transmission cancellation indication.

Clause 33. The method of clause 26, wherein the prioritizing of cancellation of the uplink transmissions includes, upon determination that the arrival timing of the second control information message does not precede the reference time point, performing cancellation of the uplink transmissions in sequence of the arrival of the first control information messages or first canceling an uplink transmission that at least partially overlaps one or more high-priority physical uplink shared channels (PUSCH).

Clause 34. The method of any of clauses 1-33, further comprising determining, by the first wireless device, whether to resume a canceled uplink transmission based on the timing analysis or the comparison result.

Clause 35. The method of any of clauses 1-33, further comprising determining, by the first wireless device, whether to resume a canceled uplink transmission based on a number of symbols between a last symbol of a message carrying the uplink cancellation information and a first symbol or a first symbol of the part to be cancelled of an earliest uplink transmission among a group of uplink transmissions scheduled by the one or more control information messages.

Clause 36. The method of any of clauses 1-33, further comprising resuming, by the first wireless device, a canceled uplink transmission that overlaps, at least in part, an uplink transmission that overlaps a resource occupied by the uplink cancellation information if the canceled uplink transmission does not overlap the resource occupied by the uplink cancellation information.

Clause 37. The method of any of clauses 1-33, further comprising determining whether to cancel all the uplink transmissions that conflict with the resource occupied by the uplink cancellation information.

Clause 38. The method of any of clauses 1-37, wherein the prioritizing of cancellation of the uplink transmissions includes canceling a time-slot-based physical uplink control channel (PUCCH)/physical uplink shared channel (PUSCH) and transmitting a sub-slot-based physical uplink control channel (PUCCH).

Clause 39. The method of any of clauses 1-37, wherein the prioritizing of cancellation of the uplink transmissions includes canceling a slot-based physical uplink control channel (PUCCH)/physical uplink shared channel (PUSCH) and transmitting a sub-slot-based physical uplink control channel (PUCCH).

Clause 40. A wireless communication method, comprising: receiving, by a first wireless device, one or more message comprising a transmission cancellation indication indicating that a transmission previously scheduled for the first wireless device is to be cancelled; and implementing, by the first wireless device, the transmission cancellation using one of multiple cancellation modes according to a condition associated with the first wireless device.

Clause 41. The method of clause 40, wherein the multiple cancellation modes include performing an inter-UE cancellation to first cancel an uplink transmission that at least partially overlaps a time-frequency resource occupied by uplink cancellation information carried by the one or more message.

Clause 42. The method of clause 40, wherein the multiple cancellation modes include performing cancellation of uplink transmissions in sequence of the arrival of the messages.

Clause 43. The method of any of clauses 40-42, wherein the multiple cancellation modes are implemented based on an analysis on timings of the one or more messages.

Clause 44. The method of any of clauses 40-42, further comprising implementing multiple recovery modes to resume a canceled transmission according to the condition associated with the first wireless device.

Clause 45. The method of any of clauses 1-44, wherein the one or more control information messages associated with transmission scheduling include downlink control information (DCI).

Clause 46. The method of any of clauses 1-44, wherein the at least one control information message associated with transmission cancellation includes uplink cancellation information (ULCI).

Clause 47. The method of any of clauses 1-44, wherein the predetermined condition is defined through a radio resource control (RRC) signaling.

Clause 48. The method of any of clauses 1-44, wherein the first wireless device is a user equipment (UE).

Clause 49. An apparatus for wireless communication, comprising a memory and a processor, wherein the processor reads code from the memory and implements a method recited in any of clauses 1 to 48.

Clause 50. A computer readable program storage medium having code stored thereon, the code, when executed by a processor, causing the processor to implement a method recited in any of clauses 1 to 48.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a first wireless device, one or more control information messages, at least one of the control information messages including a transmission cancellation indication indicating that a transmission previously scheduled for the first wireless device is to be cancelled;

performing, by the first wireless device, a timing analysis on the at least one of the control information messages including the transmission cancellation indication; and determining, by the first wireless device, whether to cancel a transmission overlapping with a time-frequency resource indicated by the transmission cancellation indication at least according to the timing analysis;

wherein the timing analysis includes:

upon determination that both a first time difference between a first time point and a second time point and a second time difference between a third time point and a fourth time point satisfy a predetermined condition, performing an inter-UE cancellation to first cancel an uplink transmission that at least partially overlaps a time-frequency resource indicated by the transmission cancellation indication, wherein the first time point is determined based on the one or more control information messages, the second time point is determined based on the uplink transmissions scheduled by the control information or corresponding to a configured grant, wherein the third time point is determined based on the one or more control information messages, and the fourth time point is determined based on the uplink transmissions scheduled by the control information or corresponding to the configured grant, and the fourth time point is different from the second time point; or upon determination that at least one of the first and second time differences fails to satisfy the predetermined condition, performing cancellation of the uplink transmissions in sequence of an arrival of the messages or first canceling an uplink transmission that at least partially overlaps one or more high priority-physical uplink shared channels (PUSCH).

2. The method of claim 1, wherein the first time point is at a last symbol of the control information message that includes the uplink cancellation information, or at a last symbol of the last control information message that the first wireless device is operable to respond to.

3. The method of claim 1, wherein the third time point is at a last symbol of the control information message that includes the uplink cancellation information, or at a last symbol of the last control information message that the first wireless device is operable to respond to.

4. The method of claim 1, wherein the second time point is:

at a first symbol of an earliest uplink transmission among a group of uplink transmissions that at least partially overlap with one another or a first symbol of a part to be cancelled of the earliest uplink transmission; or at a first symbol of an earliest uplink transmission with a high priority among a group of uplink transmissions that at least partially overlap with one another or a first symbol of the part to be cancelled of the earliest uplink transmission; or at a first symbol of an earliest physical uplink shared channel (PUSCH) with a high priority among a group of uplink transmissions that at least partially overlap with one another or a first symbol of the part to be cancelled of the earliest PUSCH; or at a first symbol of an earliest uplink transmission among a group of uplink transmissions that at least partially overlap with one another or a first symbol of the part to be cancelled of the earliest uplink transmission, the group of uplink transmissions overlapping with a time-frequency resource indicated by the transmission cancellation indication.

5. The method of claim 1, wherein the fourth time point is: at a first symbol of an earliest uplink transmission among a group of uplink transmissions that at least partially overlap with one another or a first symbol of a part to be cancelled of the earliest uplink transmission, wherein the group of uplink transmissions overlaps at least one uplink transmission that overlaps with a time-frequency resource indicated by the transmission cancellation indication, and wherein the group of uplink transmissions does not overlap with the time-frequency resource indicated by the transmission cancellation indication; or at a first symbol of an earliest uplink transmission among a group of uplink transmissions that at least partially overlap with one another or a first symbol of the part to be cancelled of the earliest uplink transmission, and wherein the earliest uplink transmission is to be saved or restored.

6. The method of claim 1, wherein the timing analysis further includes:

determining, by the first wireless device, a reference time point based on a first symbol of each of uplink transmissions scheduled by the one or more control information messages or a first symbol of a part to be cancelled of each of the uplink transmissions; and comparing, by the first wireless device, the reference time point with an arrival timing of at least one control information message.

7. The method of claim 6, further comprising:

determining, by the first wireless device, whether to cancel a transmission overlapping with a time-frequency resource indicated by the transmission cancellation indication at least according to a result of the comparing.

8. The method of claim 6, wherein the reference time point is derived from a second time point and a fourth time point determined based on the uplink transmissions scheduled by the one or more control information messages or corresponding to the configured grant.

9. The method of claim 8, wherein the second time point is:

at a first symbol of an earliest uplink transmission among a group of uplink transmissions that at least partially overlap with one another or a first symbol of the part to be cancelled of the earliest uplink transmission; or at a first symbol of an earliest uplink transmission with a high priority among a group of uplink transmissions that at least partially overlap with one another or a first symbol of the part to be cancelled of the earliest uplink transmission; or at a first symbol of an earliest physical uplink shared channel (PUSCH) with a high priority among a group of uplink transmissions that at least partially overlap with one another or a first symbol of the part to be cancelled of the earliest PUSCH; or at a first symbol of an earliest uplink transmission among a group of uplink transmissions that at least partially overlap with one another or a first symbol of the part to be cancelled of the earliest uplink transmission, the group of uplink transmissions overlapping with a time-frequency resource indicated by the transmission cancellation indication.

10. The method of claim 8, wherein the fourth time point is:

at a first symbol of an earliest uplink transmission among a group of uplink transmissions that at least partially overlap with one another or a first symbol of the part to be cancelled of the earliest uplink transmission, wherein the group of uplink transmissions overlaps an uplink transmission that overlaps with a time-frequency resource indicated by the transmission cancellation indication, and wherein the group of uplink transmissions does not overlap with the time-frequency resource indicated by the transmission cancellation indication; or at a first symbol of an earliest uplink transmission among a group of uplink transmissions that at least partially overlap with one another or a first symbol of the part to be cancelled of the earliest uplink transmission, and wherein the earliest uplink transmission is to be saved or restored.

11. The method of claim 6, further comprising performing a cancellation of scheduled transmissions based on the timing analysis or a result of the comparing.

12. The method of claim 11, further comprising determining, by the first wireless device, whether to resume a canceled uplink transmission based on the timing analysis or the result.

13. The method of claim 11, further comprising determining, by the first wireless device, whether to resume a canceled uplink transmission based on a number of symbols between a last symbol of a message carrying the uplink cancellation information and a first symbol of an earliest uplink transmission among a group of uplink transmissions scheduled by the one or more control information messages or a first symbol of the part to be cancelled of the earliest uplink transmission.

14. The method of claim 11, further comprising resuming, by the first wireless device, a canceled uplink transmission that overlaps, at least in part, an uplink transmission that overlaps a resource occupied by the uplink cancellation information if the canceled uplink transmission does not overlap the resource occupied by the uplink cancellation information.

15. The method of claim 1, further comprising determining whether to cancel all the uplink transmissions that conflict with the resource occupied by the uplink cancellation information.

16. A wireless communication method, comprising:

receiving, by a first wireless device, one or more message comprising a transmission cancellation indication indicating that a transmission previously scheduled for the first wireless device is to be cancelled; and implementing, by the first wireless device, the transmission cancellation using one of multiple cancellation modes according to a condition associated with the first wireless device, wherein the multiple cancellation modes include performing an inter-UE cancellation to first cancel an uplink transmission that at least partially overlaps a time-frequency resource occupied by uplink cancellation information carried by the one or more message, upon determination that both a first time difference between a first time point and a second time point and a second time difference between a third time point and a fourth time point satisfy a predetermined condition; and performing cancellation of uplink transmissions in sequence of an arrival of the messages, upon determination that at least one of the first and second time differences fails to satisfy the predetermined condition, wherein the first time point is determined based on one or more control information messages, the second time point is determined based on the uplink transmissions scheduled by the control information or corresponding to a configured grant, wherein the third time point is determined based on the one or more control information messages, and the fourth time point is determined based on the uplink transmissions scheduled by the control information or corresponding to the configured grant, and the fourth time point is different from the second time point.

17. The method of claim 16, further comprising implementing multiple recovery modes to resume a canceled transmission according to the condition associated with the first wireless device.

* * * * *